United States Patent
Tokudome

(10) Patent No.: US 10,443,290 B2
(45) Date of Patent: Oct. 15, 2019

(54) DOOR OPENING AND CLOSING DEVICE

(71) Applicant: U-SHIN LTD., Tokyo (JP)

(72) Inventor: Tetuo Tokudome, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 0 days.

(21) Appl. No.: 15/297,503

(22) Filed: Oct. 19, 2016

(65) Prior Publication Data

US 2017/0114586 A1    Apr. 27, 2017

(30) Foreign Application Priority Data

Oct. 22, 2015  (JP) ................. 2015-208268

(51) Int. Cl.
   *E05F 15/73*   (2015.01)
   *E05F 15/76*   (2015.01)
   *B60R 25/20*   (2013.01)

(52) U.S. Cl.
   CPC .......... *E05F 15/73* (2015.01); *B60R 25/2036* (2013.01); *B60R 25/2054* (2013.01); *E05F 15/76* (2015.01); *E05F 2015/763* (2015.01); *E05Y 2400/45* (2013.01); *E05Y 2400/852* (2013.01); *E05Y 2900/532* (2013.01)

(58) Field of Classification Search
   CPC .................................................. E05B 53/001
   See application file for complete search history.

(56) References Cited

U.S. PATENT DOCUMENTS

| | | | | |
|---|---|---|---|---|
| 7,032,348 B1 * | 4/2006 | Epps | ................. | E05F 15/74 49/25 |
| 8,091,280 B2 * | 1/2012 | Hanzel | ................. | B60R 25/2054 296/146.4 |
| 9,002,589 B2 * | 4/2015 | Reime | ................. | G01V 8/20 296/146.4 |
| 9,475,369 B2 * | 10/2016 | Sugiura | ............... | B60R 25/2054 |
| 9,834,175 B2 * | 12/2017 | Tokudome | ............ | B60R 25/241 |
| 9,845,632 B2 * | 12/2017 | Dezorzi | ................. | E05F 15/76 |
| 2013/0169408 A1 | 7/2013 | Endo | | |
| 2014/0173986 A1 * | 6/2014 | Van Gastel | ........... | B60R 19/483 49/31 |
| 2016/0010383 A1 * | 1/2016 | Fagersand | ............... | E05F 15/73 49/506 |
| 2016/0362927 A1 * | 12/2016 | Ette | .................... | B60R 25/2054 |
| 2017/0009509 A1 * | 1/2017 | Ryu | ..................... | B60W 50/08 |
| 2017/0066407 A1 * | 3/2017 | Ette | .................... | B60R 25/2045 |
| 2017/0113652 A1 * | 4/2017 | Tokudome | .......... | B60R 25/2036 |
| 2017/0152697 A1 * | 6/2017 | Dehelean | ................ | E05F 15/73 |

FOREIGN PATENT DOCUMENTS

| | | |
|---|---|---|
| JP | 2014-009470 | 1/2014 |
| JP | 5643129 | 11/2014 |

* cited by examiner

*Primary Examiner* — Catherine A Kelly
(74) *Attorney, Agent, or Firm* — Wenderoth, Lind & Ponack, L.L.P.

(57) ABSTRACT

A door opening and closing device includes: a door opening and closing drive unit capable of opening and closing a door with respect to a vehicle body; a detection unit configured to detect a plurality of detection objects around the door; a memory part configured to store a detection result of the plurality of detection objects which are detected by the detection unit; and a control unit configured to perform an open/close control of the door by way of the door opening and closing drive unit. The control unit performs an open/close control of the door based on a detection result of the detection unit and a plurality of stored information stored in the memory part.

6 Claims, 14 Drawing Sheets

| | FIRST DETECTION UNIT | | | SECOND DETECTION UNIT | | |
|---|---|---|---|---|---|---|
| | DA1 | DA2 | DA3 | DB1 | DB2 | DB3 |
| DETECTION RESULT OF THIS TIME | 50 | 80 | 100 | 55 | 75 | 100 |
| | MEMORY PART | | | | | |
| | MA1 | MA2 | MA3 | MB1 | MB2 | MB3 |
| DETECTION RESULT OF LAST TIME, | 51 | 99 | 115 | 54 | 101 | 120 |
| DETECTION RESULT OF TIME BEFORE LAST | 49 | 101 | — | 56 | 99 | — |

DOOR OPENING AND CLOSING DEVICE

CROSS-REFERENCE TO RELATED APPLICATIONS

This application claims priority of Japanese Patent Application No. 2015-208268 filed on Oct. 22, 2015, the content of which is incorporated herein by reference.

BACKGROUND OF THE INVENTION

Technical Field

The present invention relates to a door opening and closing device used in a vehicle.

Related Art

A vehicle is equipped with a smart entry system which electrically unlocks a door locking device when a user having an electronic key approaches a door. Japanese Patent No. 5643129 discloses a door body control device which can automatically open a door even when a user does not touch a door handle in a situation where it is difficult for the user to touch the door handle such as a case where the user is holding baggage or the like with both hands.

Upon the detection of the user approaching the door by a distance measuring sensor disposed on the door, the door body control device performs the authentication of an electronic key which the user possesses. When the electronic key is authenticated as a legitimate electronic key and a set movement (operation intention) of the user is detected, the door body control device opens the door.

SUMMARY

However, the door body control device disclosed in Japanese Patent No. 5643129 detects an obstacle other than the user as a detection object. As a result, there is a possibility that the open/close control of a door is erroneously performed due to the detection of the obstacle. Japanese Patent No. 5643129 does not at all describe a measure to deal with the case where a plurality of detection objects are detected. The term "obstacle" includes a movable baggage or the like and a non-movable fixed object (wall) or the like.

It is an object of the present invention to provide a door opening and closing device which can perform an open/close control of the door based on a detection result of a plurality of detection objects.

An aspect of the present invention provides a door opening and closing device including: a door opening and closing drive unit capable of opening and closing a door with respect to a vehicle body; a detection unit configured to detect a plurality of detection objects within a detection range set around the door; a memory part configured to store a detection result of the plurality of detection objects which are detected by the detection unit; and a control unit configured to perform an open/close control of the door by way of the door opening and closing drive unit based on the detection result of the detection unit and a plurality of stored information stored in the memory part.

According to the door opening and closing device, since the open/close control of the door is performed based on the current detection result and the stored information stored in the memory part, it is possible to distinguish the obstacle whose detection result does not change from the stored information and the user whose detection result changes from the stored information. Accordingly, it is possible to prevent an erroneous operation which may be caused due to the presence of the obstacle thus realizing the open/close control of the door based on only movement of the user with certainty.

The door opening and closing device further includes a determination part configured to determine whether the detection object existing within the detection range is an object to be detected or an object not to be detected, based on a detection result of the detection unit and the stored information in the memory part, and the control unit performs the open/close control of the door by way of the door opening and closing drive unit only when the detection unit detects a set movement of the detection object which is determined, by the determination part, as the object to be detected. According to this mode, it is possible to detect an operation intention of the user stably and with high accuracy while preventing an erroneous operation which may be caused due to the obstacle.

The door opening and closing device further includes a measurement part configured to measure a distance from the detection unit to the detection object based on the detection result of the detection unit, distance information of the detection object measured by the measurement part is stored in the memory part, and the determination part determines whether the detection object is an object to be detected or an object not to be detected based on a change amount in the distance of the detection object. Further, pieces of distance information of the plurality of detection objects existing within the detection range are stored in the memory part. According to this mode, when an obstacle such as a wall exists within the detection range, it is determined with certainty that the obstacle is an object not to be detected. That is, it is possible to determine whether the detection object detected by the detection unit is an object to be detected or an object not to be detected with certainty.

The determination part determines that the subjected detection object is an object not to be detected when a state where a difference between a distance of the detection object which is measured by the measurement part and distance information of the detection object stored in the memory part is smaller than a set threshold value is continuously detected. In this case, "is smaller than a set threshold value is continuously detected" includes a case where the difference is continuously detected the set number of times and a case where the difference is continuously detected for a set time. According to this mode, it is possible to determine whether the detection object detected by the detection unit is an object to be detected or an object not to be detected with certainty.

The determination part excludes a detection result of the detection object which the determination part continuously determines as the object not to be detected, and the determination part determines the object to be detected based on the detection result of other detection objects. According to this mode, it is possible to detect movement of the legitimate object to be detected with high accuracy without causing confusion between the object not to be detected and the object to be detected.

The determination part, when the distances of the plurality of detection objects which are measured by the measurement part do not include distance information of the object not to be detected which is to be excluded, sets the subjected detection object as the object to be detected by excluding the subjected detection object from the object not to be detected. According to this mode, even in the case where a user is determined as the object not to be detected when the user temporarily stops due to some reason, the determination is cancelled when the user restarts movement and hence, an erroneous recognition of the detection object as the object not to be detected can be prevented.

According to the door opening and closing device of the present invention, even when a plurality of detection objects exist within a detection range, it is possible to distinguish an obstacle whose detection result does not change from stored information and a user whose detection result changes from stored information. Accordingly, it is possible to realize an open/close control of a door based on movement of the user with certainty while preventing an erroneous operation which may be caused due to the obstacle.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments of the present invention are described with reference to drawings.

Figure 1:
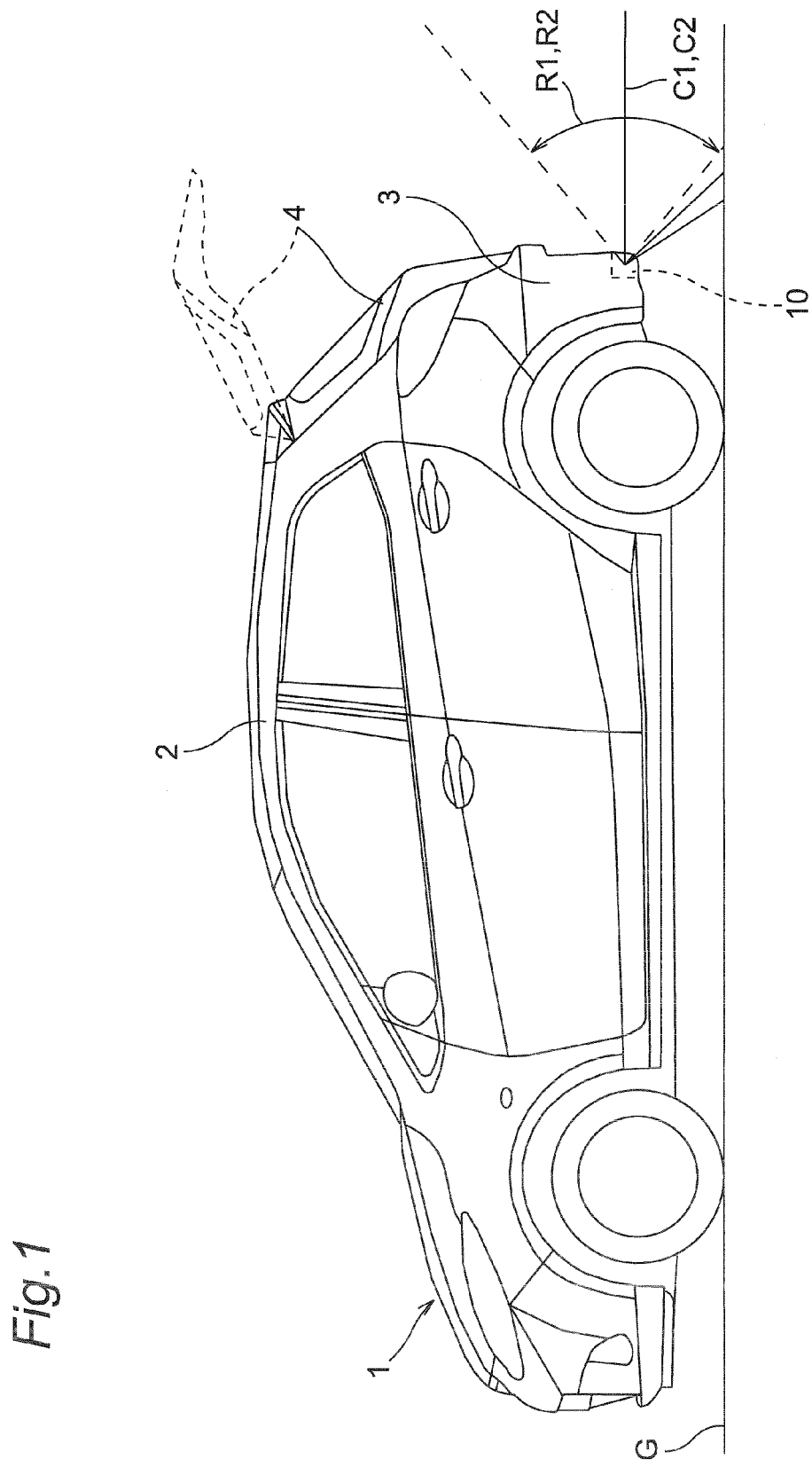
FIG. 1 is a side view of a vehicle in a state where a door opening and closing device of a first embodiment is mounted on the vehicle.
Figure 2:
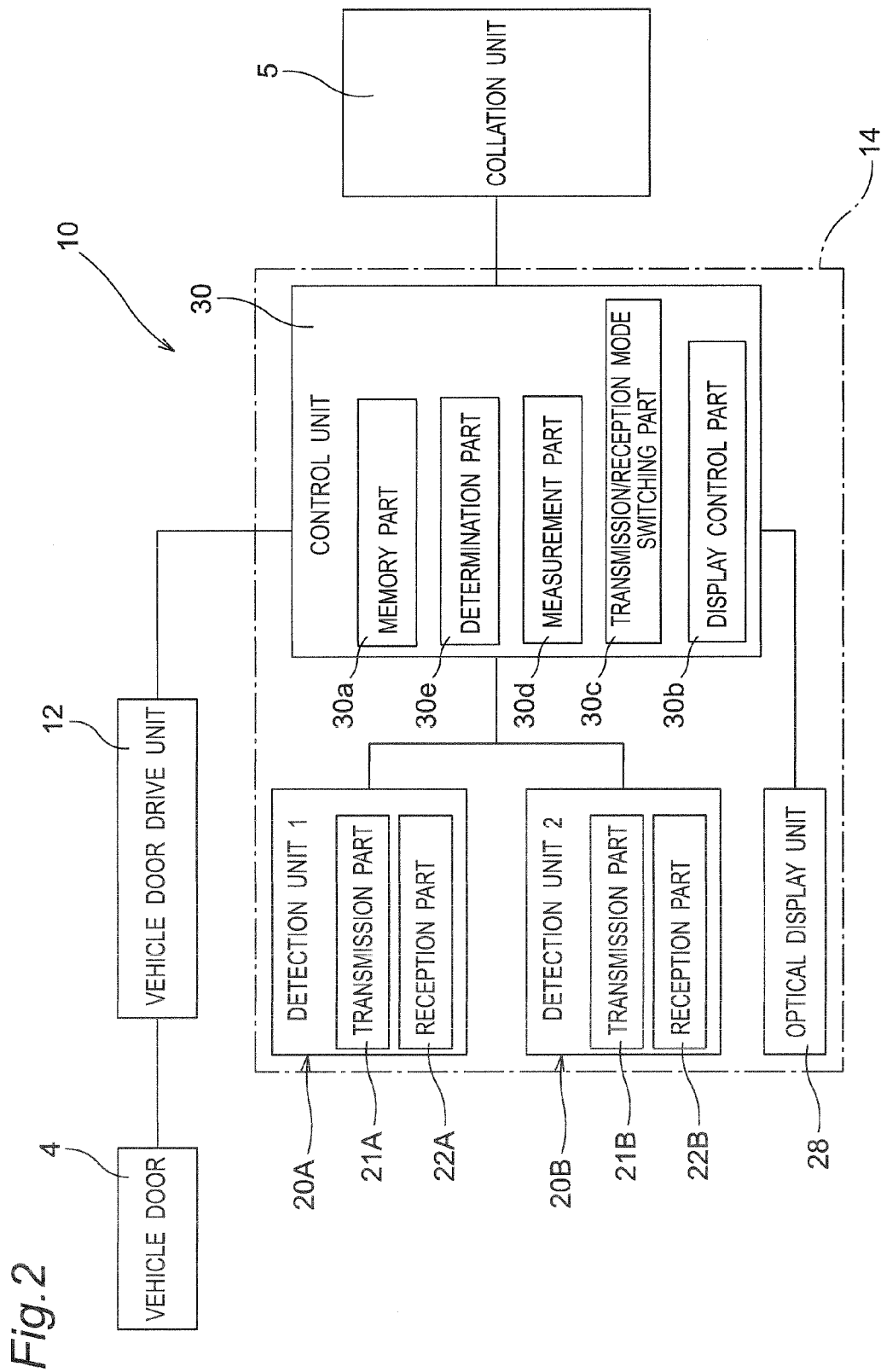
FIG. 2 is a block diagram showing a configuration of the door opening and closing device.

FIGS. 1 and 2 show a vehicle 1 on which a door opening and closing device 10 of a first embodiment is disposed. The door opening and closing device 10 automatically performs an open control or a close control of a door 4 of the vehicle 1 with respect to a vehicle body 2 when a user possessing a specified electronic key (not shown in the drawing) makes a preset movement without using his/her hand. In this embodiment, a back door is the openable/closable door 4. However, the openable/closable door 4 may be a door other than the back door.

As shown in FIG. 2, the vehicle 1 includes a host ECU 5 which controls electronic equipment including the door opening and closing device 10. The host ECU 5 also has a function as a collation unit which performs the key authentication between an electronic key and the vehicle 1 by radio communication. When a user having the electronic key approaches within a set range which is set with respect to the vehicle 1, the host ECU 5 requests the electronic key to transmit an authentication code received from the electronic key with an authorized code registered in the host ECU 5. When the authentication code agrees with the authorized code, the host ECU 5 outputs a signal to the door opening and closing device 10 so as to allow the door opening and closing device 10 to perform an open/close control of the door 4. A function of a collation unit may be imparted to a controller 30 (described later) of the door opening and closing device 10.

(Detail of Door Opening and Closing Device)

The door opening and closing device 10 is disposed at a lower portion of the center of a bumper 3 of the vehicle body 2. The door opening and closing device 10 includes: a door opening and closing drive unit 12 which can open/close the door 4; a pair of distance measuring sensors 20A, 20B which are a detection unit; LEDs 28 which is optical display units; and the controller 30 which is a control unit. The door opening and closing drive unit 12 is disposed on the vehicle 1. A printed circuit board 24 on which the distance measuring sensors 20A, 20B, the LEDs 28 and the controller 30 are mounted is housed and disposed in a casing 14.

The door opening and closing drive unit 12 is a mechanism including a drive device (a motor, a gear mechanism, a damper and the like) which can rotate the door 4 connected to the vehicle body 2 by a hinge in the opening direction and the closing direction. The door opening and closing drive unit 12 is communicably connected to the controller 30. In this embodiment, the door opening and closing drive unit 12 and the controller 30 are connected to each other via wired connection using a communication cable. However, the door opening and closing drive unit 12 and the controller 30 may be wirelessly connected to each other via radio communication at a predetermined frequency.

Figure 3:
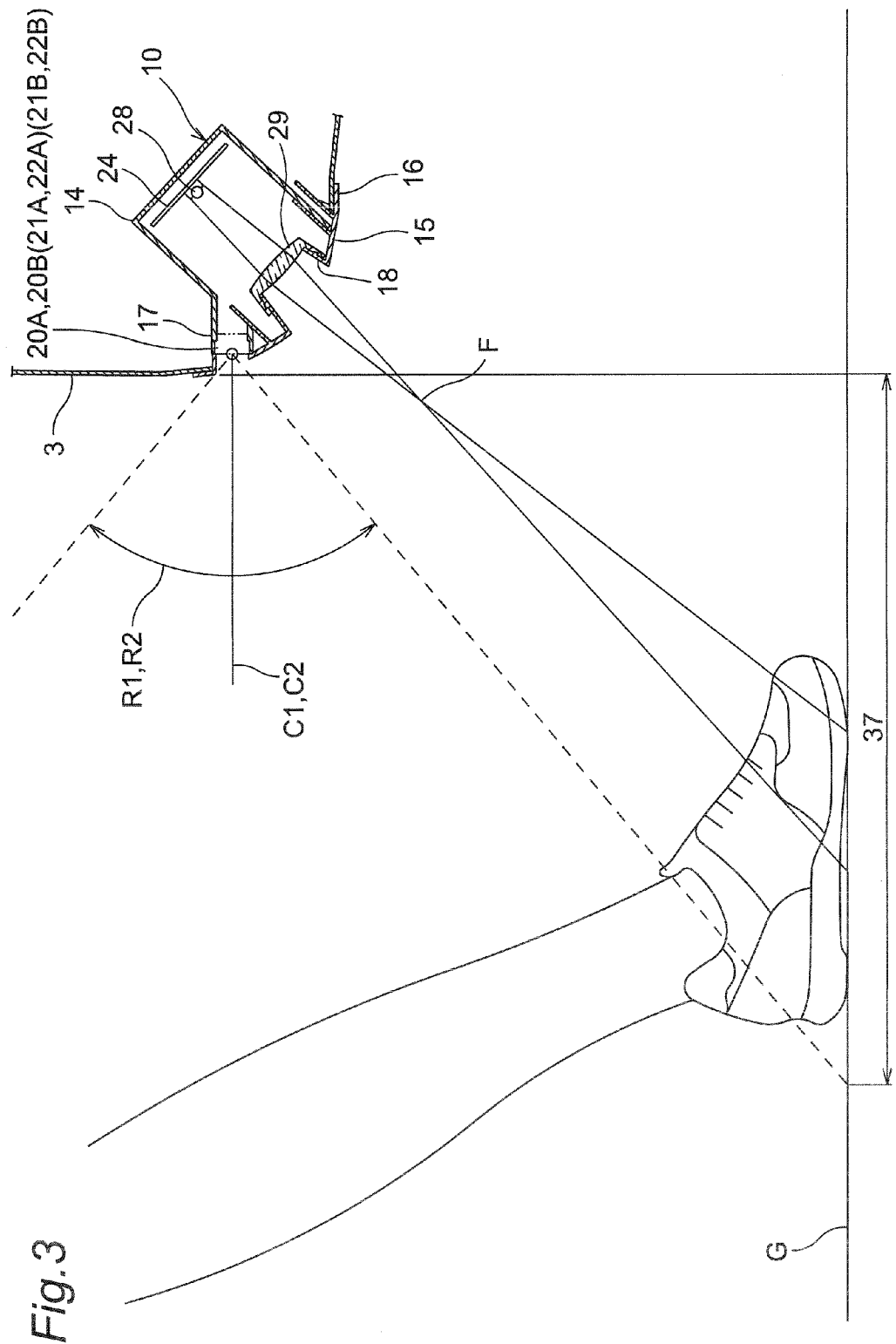
FIG. 3 is a cross-sectional view of the door opening and closing device of the first embodiment.
Figure 4:
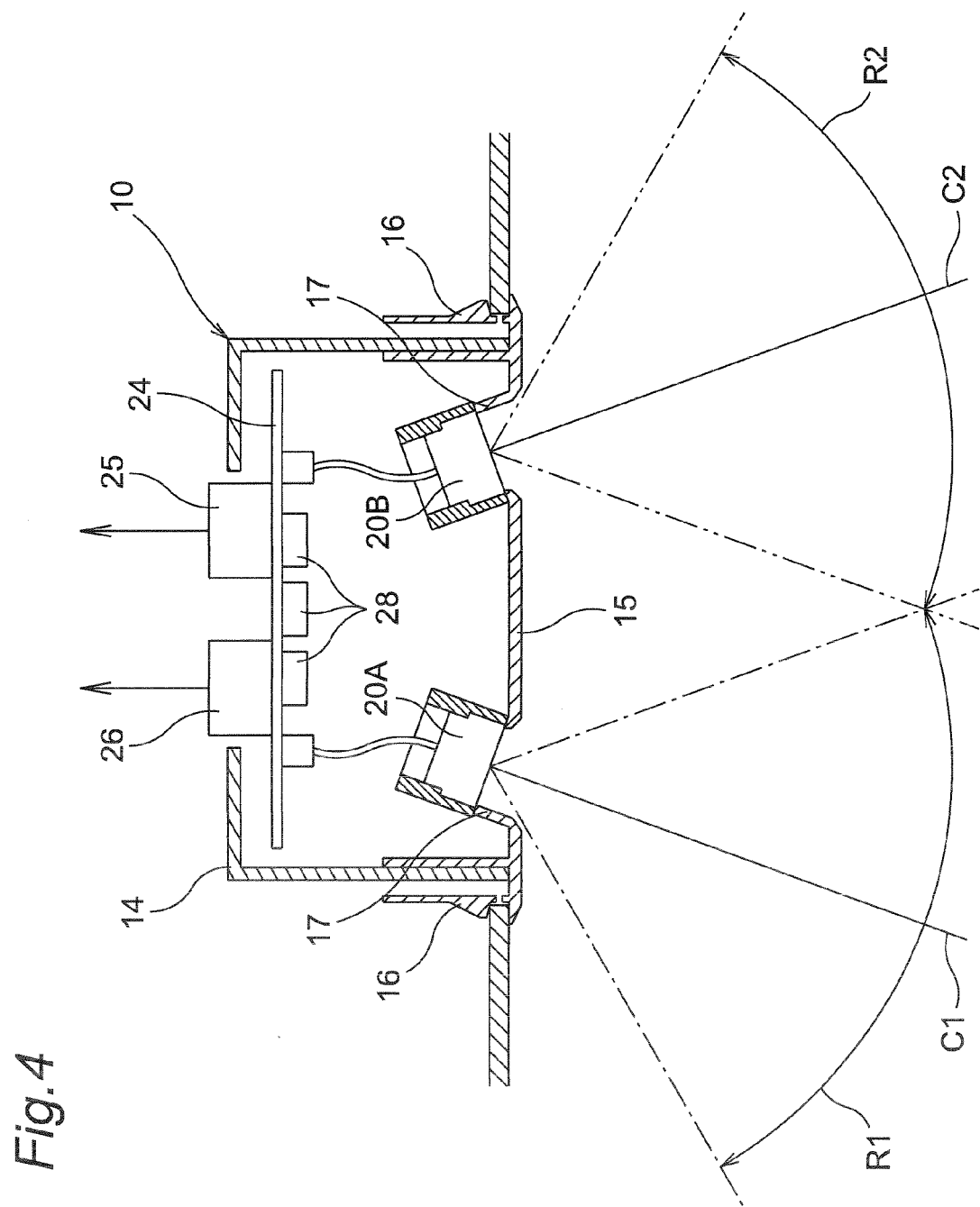
FIG. 4 is another cross-sectional view of the door opening and closing device of the first embodiment.

As shown in FIGS. 3 and 4, a casing 14 is a box body having one end opened, and includes a bezel 15 which covers an opening side of the casing 14. A fixing part 16 for fixing the casing 14 to the bumper 3 is formed on the bezel 15. Sensor mounting portions 17 having a substantially cylindrical shape and opened in the horizontal direction are mounted on the bezel 15. The sensor mounting portions 17, 17 are respectively inclined and opened to both outer sides such that axes of the sensor mounting portions 17, 17 are gradually away from each other. A lens mounting portion 18 which has substantially a cylindrical shape and on which a lens 29 is disposed is mounted on the bezel 15. The lens mounting portion 18 is disposed on the bezel 15 such that an axis of the lens mounting portion 18 is inclined downward and outward (rearward).

The distance measuring sensors 20A, 20B are detection units which detect detection objects around the door 4. These distance measuring sensors 20A, 20B are mounted on the sensor mounting portions 17, 17 of the bezel 15 respectively. The distance measuring sensors 20A, 20B are communicably connected to the printed circuit board 24 by lead lines. With reference to FIG. 2, the first distance measuring sensor (first detection unit) 20A includes a transmission part 21A which transmits a radio signal (ultrasonic wave) having a predetermined frequency, and a reception part 22A which receives a reflection signal (reflected wave) which is formed by the reflection of the radio signal on the detection object. The second distance measuring sensor (second detection unit) 20B includes a transmission part 21B which has substantially the same configuration as the transmission part 21A and a reception part 22B which has substantially the same configuration as the reception part 22A. In this embodiment, the distance measuring sensor 20A, 20B is formed of an ultrasonic sensor. The distance measuring sensor 20A, 20B may be configured such that the transmission part 21A, 21B and the reception part 22A, 22B are disposed individually or independently. Alternatively, the distance measuring sensor 20A, 20B may be configured such that the transmission part and the reception part are formed into an integral body thus forming a transmission/reception part. A detection object which can be detected by the distance measuring sensor 20A, 20B is an object which can reflect a radio signal, and includes an obstacle such as a wall or baggage, not to mention a user who is a driver of a vehicle. In this embodiment, the obstacle includes objects other than a user such as baggage which can be moved and placed around the vehicle, a structure which exists around the vehicle and cannot be moved (a wall or a pole), other vehicles parked near the vehicle or the like.

The printed circuit board 24 is mounted on the casing 14 such that the printed circuit board 24 extends in the direction orthogonal to an axis of the lens mounting portion 18. A connector 25 for making the printed circuit board 24 communicably connected to the host ECU 5 and a connector 26 for making the printed circuit board 24 electrically connected to a constant voltage power source are mounted on the printed circuit board 24. These connectors 25, 26 are mounted on the printed circuit board 24 such that the connectors 25, 26 are exposed to the outside from a bottom of the casing 14. A plurality of (three in this embodiment) LEDs 28, a microcomputer not shown in the drawing which forms the controller 30 and the like are mounted on a lens mounting portion 18 side of the printed circuit board 24.

The LEDs 28 are optical display units which perform an optical display (operation mark) on the ground so as to guide a user to a set position. Three LEDs 28 are mounted on the printed circuit board 24 such that these LEDs 28 are positioned in the vicinity of the axis of the lens mounting portion 18. With such a configuration, these LEDs 28 illuminate the ground as spotlights so that a user can visually recognize the operation mark even in a state where an area around the vehicle 1 is bright, not to mention in a state where the area around the vehicle 1 is dark. The lens 29 is mounted on the lens mounting portion 18, and the lens 29 converges light from the LEDs 28 and directs a light to a ground G outside the vehicle body 2. A focal point F of the lens 29 is set such that the focal point F is positioned at a rear end of the vehicle 1.

As shown in FIG. 2, the controller 30 is a control unit which controls the LEDs 28 based on detection results of the distance measuring sensors 20A, 20B, and performs open/close driving of the door 4 by controlling the door opening and closing drive unit 12. The controller 30 includes: a memory part 30a; a display control part 30b; a transmission/reception mode switching part 30c; a measurement part 30d; and a determination part 30e. In this embodiment, a piece of microcomputer is used as the controller 30, and the controller 30 has all the functions of the memory part 30a, the display control part 30b, the transmission/reception mode switching part 30c, the measurement part 30d and the determination part 30e. However, these parts may be individually provided as control parts.

A program for controlling the door opening and closing device 10 is stored in the memory part 30a. Setting data such as threshold values T which are used in the program are also stored in the memory part 30a. Detection data (detection results) DA1 to DAn, DB1 to DBn relating to detection objects detected by the distance measuring sensors 20A, 20B are stored in the memory part 30a as distance information. The memory part 30a can store the stored data (stored information) MA1 to MAn and the stored data MB1 to MBn by an amount corresponding to the set number of times (ten times, for example) of detection, and the data are deleted in order from the oldest data. Obstacle data K1 to Kn relating to obstacles which are determined as objects not to be detected are also stored in the memory part 30a as stored information.

The display control part 30b changes over the state of the LEDs 28 between a light-on state, a blinking state, and a light-off state. By controlling the state of the LEDs 28 in this manner, it is possible to guide a user to move to a set position and, at the same time, it is possible to inform a user of proper timing of movement. A sound may be outputted together with lighting of the LEDs 28 as a part which informs the user of proper timing of movement.

The transmission/reception mode switching part 30c changes over a transmission/reception mode of the first distance measuring sensor 20A and a transmission/reception mode of the second distance measuring sensor 20B. To be more specific, the transmission/reception mode switching part 30c changes over a transmission/reception function of the first distance measuring sensor 20A and a transmission/reception function of the second distance measuring sensor 20B between a first transmission/reception mode and a second transmission/reception mode. In the first transmission/reception mode, the transmission part 21A, 21B and the reception part 22A, 22B are simultaneously driven in both the first distance measuring sensor 20A and the second distance measuring sensor 20B. In the second transmission/reception mode, only the transmission part 21A, 21B is driven in one of the first distance measuring sensor 20A and the second distance measuring sensor 20B, and only the reception part 22A, 22B is driven in the other of the first distance measuring sensor 20A and the second distance measuring sensor 20B. Further, in the second transmission/reception mode, a transmission/reception function of the first distance measuring sensor 20A and a transmission/reception function of the second distance measuring sensor 20B are alternately changed over. That is, a first state where a radio signal is outputted from the transmission part 21A of the first distance measuring sensor 20A and a reflection signal is received by the reception part 22B of the second distance measuring sensor 20B and a second state where a radio signal is outputted from the transmission part 21B of the second distance measuring sensor 20B and a reflection signal is received by the reception part 22A of the first distance measuring sensor 20A are alternately changed over.

The measurement part 30d measures distances from the first distance measuring sensor 20A to detection objects based on the detection results DA1 to DAn of the first distance measuring sensor 20A, and also measures distances from the second distance measuring sensor 20B to the detection objects based on the detection result DB1 to DBn of the second distance measuring sensor 20B. In this embodiment, the distance measuring sensor 20A, 20B can measure (determine) a distance from the distance measuring sensor 20A, 20B to each detection object based on a time elapsed from a point of time when a radio signal is outputted from the transmission part 21A, 21B to a point of when that a reflection signal is inputted to the reception part 22A, 22B. When a distance from the distance measuring sensor 20A, 20B to each detection object is small, a time elapsed from the transmission of a signal to the reception of a signal is short compared to a case where a distance from the distance measuring sensor 20A, 20B to each detection object is large. In this manner, by measuring a time which corresponds to a distance, the distance from the distance measuring sensors 20A, 20B to each detection object can be measured.

The determination part 30e determines whether or not detection objects exist based on detection results (measurement results of the measurement part 30d) DA1 to DAn, DB1 to DBn of the distance measuring sensors 20A, 20B. It is also determined whether the detected detection objects are objects to be detected or objects not to be detected based on detection results DA1 to DAn, DB1 to DBn of the distance measuring sensors 20A, 20B and stored information MA1 to MAn, MB1 to MBn in the memory part 30a.

Here, the description is made in detail with respect to the determination on whether detected detection objects are objects to be detected or objects not to be detected. Based on current detection results DA1 to DAn, DB1 to DBn detected by the distance measuring sensors 20A, 20B and last-time stored information MA1 to MAn, MB1 to MBn (obtained in the last-time detection) stored in the memory part 30a, the determination part 30e calculates a change amount in a distance with respect to all measured detection objects. The determination part 30e determines whether the detection object is an object to be detected or an object not to be detected based on whether a change amount in distance is equal to or smaller than a threshold value T1 (2 cm, for example). The determination part 30e performs a comparison between the detection results DA1 to DAn, DB1 to DBn and the stored information MA1 to MAn, MB1 to MBn for the respective distance measuring sensors 20A, 20B. Further, the determination part 30e performs a comparison in such a manner that each one of the detection results DA1 to DAn, DB1 to DBn is compared with all stored information MA1 to MAn, MP1 to MBn on a one-to-one basis, and the determination part 30e determines that a detection object is an object not to be detected when data agree with each other, that is, when the detection result agrees with the stored information.

Figures 6, 7A:
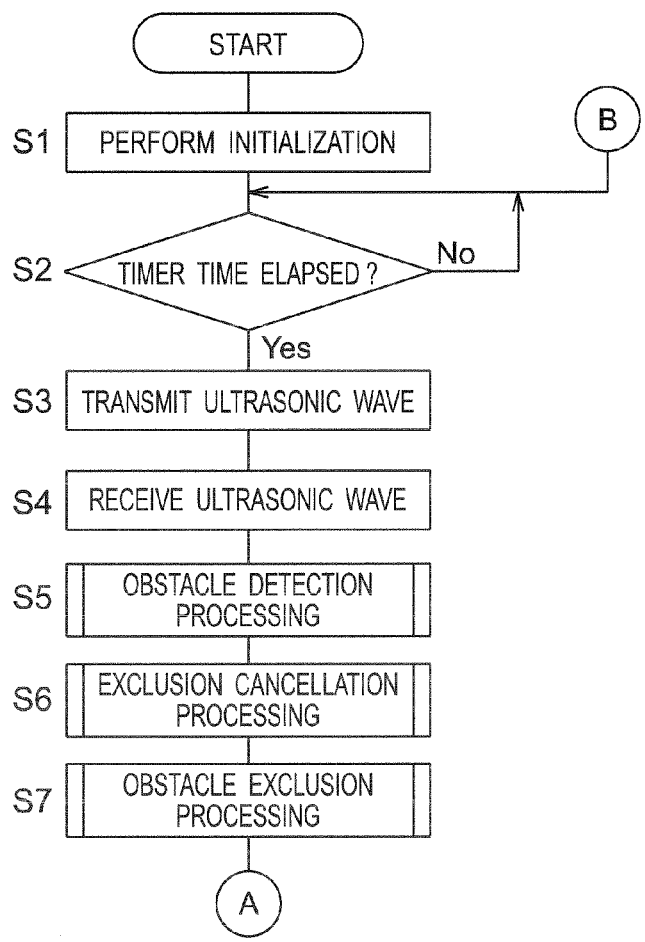
FIG. 6 is a table showing a method of determining whether or not a detection object is an obstacle.
FIG. 7A is a flowchart showing a control performed by a control unit.

For example, as shown in FIG. 6, the first distance measuring sensor 20A receives three reflection signals, and measures a first detection result DA1 (50 cm), a second detection result DA2 (80 cm) and a third detection result DA3 (100 cm) through the measurement part 30d. In the same manner, the second distance measuring sensor 20B receives three reflection signals, and measures a first detection result DB1 (55 cm), a second detection result DB2 (75 cm) and a third detection result (100 cm) through the measurement part 30d. A first stored information MA1 (51 cm), a second stored information MA2 (99 cm), and a third stored information MA3 (115 cm) which are last-time detection results of the first distance measuring sensor 20A are stored in the memory part 30a. In the same manner, first stored information MB1 (54 cm), second stored information MB2 (101 cm), and third stored information MB3 (120 cm) which are last-time detection results of the second distance measuring sensor 20B are stored in the memory part 30a.

In comparison of the first detection result DA1 of the first distance measuring sensor 20A with the stored information MA1 to MA3 stored in the memory part 30a, a change amount of the first detection result DA1 from the stored information MA1 is equal to or smaller than the threshold value T1 so that it is understood that there is no change in distance (position) of the detection object. Next, in a comparison of the second detection result DA2 with the stored information MA1 to MA3, a change amount of the second detection result DA2 is larger than the threshold value T1 with respect to all stored information MA1 to MA3 so that it is understood that the position of the detection object is changed. Next, in a comparison of the third detection result DA3 with the stored information MA1 to MA3, a change amount of the third detection result DA3 from the stored information MA2 is equal to or smaller than the threshold value T1 so that it is understood that there is no change in the position of the detection object.

In the same manner, in a comparison of the first detection result DB1 of the second distance measuring sensor 20B with the stored information MB1 to MB3 in the memory part 30a, a change amount of the first detection result DB1 from the stored information MB1 is equal to or smaller than the threshold value T1 so that it is understood that there is no change in position of the detection object. Next, in a comparison of the second detection result DB2 with the stored information MB1 to MB3, a change amount of the second detection result DB2 is larger than the threshold value T1 with respect to all stored information MB1 to MB3 so that it is understood that the position of the detection object is changed. Next, in a comparison of the third detection result DB3 with the stored information MB1 to MB3, a change amount of the third detection result DB3 from the stored information MB2 is equal to or smaller than the threshold value T1 so that it is understood that there is no change in position of the detection From these results, it can be determined that the detection objects having the detection results DA1, DA3 which substantially agree with the stored information MA1, MA2 are objects not to be detected such as obstacles. It can be also determined that the detection object having the detection result DA2 which does not agree with the stored information MA1 to MA3 is an object to be detected which is a movable body including a user and has moved from the position of 115 cm to the position of 80 cm. In the same manner, it can be determined that the detection object having the detection results DB1, DB3 which substantially agree with the stored information MB1, MB2 are objects not to be detected. It can be also determined that the detection object having the detection result DB2 which does not agree with the stored information MB1 to MB3 is an object to be detected and has moved from the position of 120 cm to the position of 75 cm.

As in the case of an example shown in FIG. 6, the detection results DA1, DA3 of the obstacle measured by the distance measuring sensor 20A and the detection results DB1, DB3 of the obstacle measured by the distance measuring sensor 20B have relevance. In this embodiment, however, detection results DA1 to DAn measured by the first distance measuring sensor 20A and detection results DB1 to DBn measured by the second distance measuring sensor 20B are not associated with each other, and detection results DA1 to DAn and detection results DB1 to DBn are independently used for the determination on whether a detection object is an object to be detected or an object not to be detected. The reason is as follows. There is a case where an obstacle (object not to be detected) exists within one detection range at a position which can be detected by either one of the distance measuring sensors 20A, 20B, and a user (object to be detected) exists within the other detection range at the same distance position as the obstacle. In such a case, there is a possibility that the sensor erroneously detects the user as the obstacle. That is, as described later, the detection results DA1 to DAn, DB1 to DBn relating to the user which is an object to be detected and obtained by the distance measuring sensors 20A, 20B are detected in one operation zone 34 where both the first distance measuring sensor 20A and the second distance measuring sensor 20B can detect a detection object. Accordingly, the detection results DA1 to DAn and the detection results DB1 to DBn substantially agree with each other. However, unless the obstacle is in a stopped state in the operation zone 34 for some reason, the obstacle having the detection results DA1 to DAn, DB1 to DBn exists within either one of the detection range of the first distance measuring sensor 20A or the detection range of the second distance measuring sensor 20B.

Figure 5:
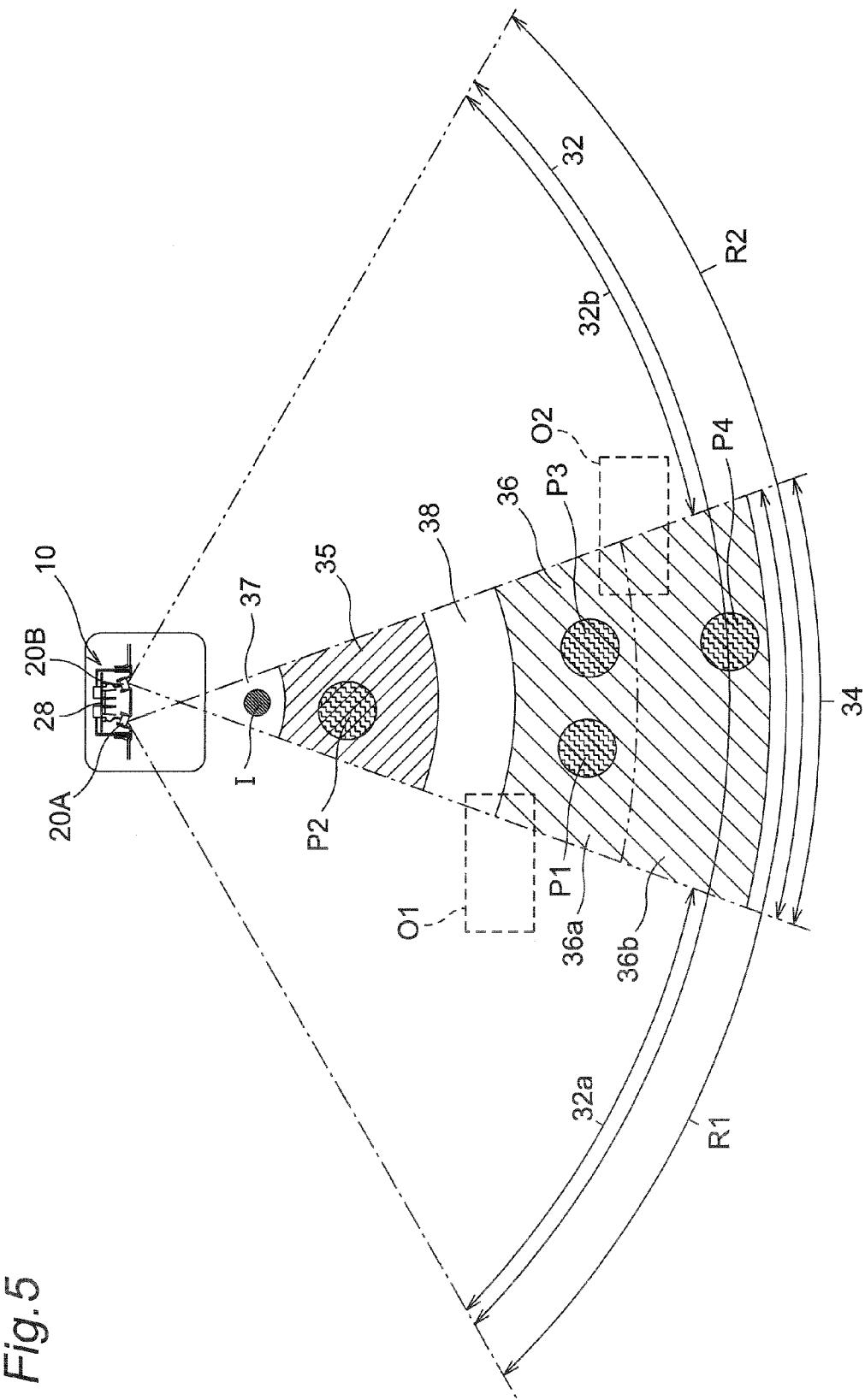
FIG. 5 is a plan view showing a detection region of the door opening and closing device.

Next, with reference to FIG. 5, the description is made with respect to setting of detection ranges of the distance measuring sensors 20A, 20B and a control performed by the controller 30.

(Detail of Detection Range)

As shown in FIG. 5, the transmission parts 21A, 21B of the distance measuring sensors 20A, 20B transmit radio signals such that the radio signals spread radially. With reference to FIG. 3, the transmission parts 21A, 21B are mounted on the vehicle body 2 by way of the casing 14. The transmission parts 21A, 21B are disposed such that radio signals are outputted along output centers C1, C2 of the radio-signals which extend in the horizontal direction from the vehicle body 2. The horizontal direction means a direction extending along the ground G on which a vehicle is parked. Also with reference to FIG. 4, the transmission parts 21A, 21B are disposed such that the output centers C1, C2 of the radio-signals do not intersect with each other. That is, the output centers C1, C2 respectively extend to both outer sides in an inclined manner in the directions so that the output centers C1, C2 are gradually away from each other. With such a configuration, the respective distance measuring sensors 20A, 20B can perform both the detection of a detection object at a remote distance away from the vehicle body 2 and the detection of a detection object at a near distance close to the vehicle body 2.

Conical output ranges which are formed by radio signals outputted from the transmission part 21A, 21B define detection ranges R1, R2 of the distance measuring sensor 20A, 20B. The output center C1 of the radio signal transmitted from the transmission part 21A is a first detection center axis of the first detection range R1 of the first distance measuring sensor 20A. The output center C2 of the radio signal transmitted from the transmission part 21B is a second detection center axis of the second detection range R2 of the second distance measuring sensor 20B. The distance measuring sensors 20A, 20B are disposed such that a portion of the detection range R1 of the first distance measuring sensor 20A on a center side of the vehicle body 2 and a portion of the detection range R2 of the second distance measuring sensor 20B on the center side of the vehicle body 2 overlap with each other. An area where the detection range R1 and the detection range R2 overlap with each other forms one operation zone 34 where both the first distance measuring sensor 20A and the second distance measuring sensor 20B can detect detection objects.

In the whole region of the pair of detection ranges R1, R2 including the operation zone 34, detection objects are detected by the first distance measuring sensor 20A or the second distance measuring sensor 20B. Accordingly, the region defines an approach region 32 where the authentication of the key is started. In the approach region 32, in a first zone 32a formed by excluding the operation zone 34 from the detection range R1, only the first distance measuring sensor 20A can detect the detection object. In the second zone 32b formed by excluding the operation zone 34 from the detection range R2, only the second distance measuring sensor 20B can detect a detection object.

The operation zone 34 is divided into two or more operation detection sub zones depending on a distance from the distance measuring sensors 20A, 20B. To be more specific, the operation zone 34 has a trigger sub zone 35 which is a first operation detection sub zone closest to the vehicle body 2, and a start sub zone 36 which is a second operation detection sub zone positioned more remote from the vehicle body 2 than the trigger sub zone 35 is. The start sub zone 36 is distance measuring sensors 20A, 20B, and a second portion 36b disposed on a side remote from the distance measuring sensors 20A, 20B.

The trigger sub zone 35 is a zone where the distance measuring sensors 20A, 20B detect a state where a user who is a detection object approaches the vehicle body 2. For example, the trigger sub zone 35 is set as a range between the position away from the vehicle body 2 by 20 cm to the position away from the vehicle body 2 by 40 cm.

The start sub zone 36 is a zone where the door 4 does not substantially hit a user even when the door 4 is opened and closed. The start sub zone 36 ranges between a position away from the vehicle body 2 by 120 cm and a position away from the vehicle body 2 by 50 cm, for example. The first portion 36a forms substantially a front half of the start sub zone 36. For example, the first portion 36a ranges between the position away from the vehicle body 2 by 50 cm and a position away from the vehicle body 2 by 80 cm. In the first portion 36a, depending on a height or a posture of a user, there still remains a possibility that the door 4 hits the user when the door 4 is opened or closed. The second portion 36b forms substantially a rear half of the start sub zone 36. For example, the second portion 36b ranges between the position away from the vehicle body 2 by 80 cm and the position away from the vehicle body 2 by 120 cm. In the second portion 36b, regardless of a height or a posture of the user, there is no possibility that the door 4 hits a user even when the door 4 is opened or closed.

A first non-operation sub zone 37 is set in the operation zone 34 on a vehicle body 2 side of the trigger sub zone 35. With reference to FIG. 3, the first non-operation sub zone 37 is too close to the distance measuring sensors 20A, 20B so that a portion of the first non-operation sub zone 37 on a ground G side falls outside the detection ranges R1, R2. Accordingly, the first non-operation sub zone 37 is excluded from the operation detection sub zone. A second non-operation sub zone 38 having a predetermined width is set between the trigger sub zone 35 and the start sub zone 36. The second non-operation sub zone 38 is a space for ensuring whether or not a detection object exists within either one of the trigger sub zone 35 or the start sub zone 36.

The determination part 30e can determine that a detection object exists within the first zone 32a when only the first distance measuring sensor 20A receives reflection signals. The determination part 30e can determine that a detection object exists within the second zone 32b when only the second distance measuring sensor 20B receives reflection signals. Further, the determination part 30e can determine that a detection object exists within the operation zone 34 when both the first distance measuring sensor 20A and the second distance measuring sensor 20B receive reflection signals. As described previously, the measurement part 30d can measure a distance from the vehicle body to a detection object based on a time elapsed from the transmission of a radio signal to the reception of a reflection signal. Accordingly, the determination part 30e can determine the sub zone in operation zone 34 based on a distance measured by the measurement part 30d.

As described above, in this embodiment, by making a portion of the first detection range R1 of the first distance measuring sensor 20A and a portion of the second detection range R2 of the second distance measuring sensor 20B overlap with each other, a specified operation zone having a fixed width direction can be set without using a special device. Accordingly, it is possible to stably detect an operation intention of a user with high accuracy and hence, an erroneous detection can be prevented with certainty. Further, the respective distance measuring sensors 20A, 20B are disposed such that the detection center axes C1, C2 do not intersect with each other, that is, the detection center axes C1, C2 respectively extend in an inclined manner toward outside from each other. Accordingly, the distance measuring sensors 20A, 20B can be easily assembled to the casing 14.

The plurality of operation detection zones 35, 36 are set corresponding to distances from the distance measuring sensors 20A, 20B. Accordingly, only a detection object (user) which moves from a fixed direction passing the plurality of operation detection zones 35, 36 is detected as a legitimate operation intention. With such a configuration, it is possible to prevent an erroneous operation which may be caused due to the intrusion of an animal or a foreign substance into the operation zone from the lateral direction or an approach of a third party who does not know an operation method.

The distance measuring sensor 20A, 20B detects a detection object upon the reception of a reflection signal of a radio signal outputted in the horizontal direction. Accordingly, there is no possibility that the distance measuring sensor 20A, 20B receives a reflection signal from a member such as a ground which is disposed at a near distance from a vehicle and does not have a fixed height. Further, the distance measuring sensors 20A, 20B are mounted on the vehicle body 2 and hence, the same reference (distance) is used in detecting a detection object in both the case where an open control of the door 4 is performed and the case where a close control of the door 4 is performed. Accordingly, an erroneous detection which may be caused due to the detection unit can be prevented with certainty and hence, it is possible to rapidly detect an operation intention of a user with high accuracy.

(Detail of Control Performed by Controller)

In detecting the detection objects which exist within the approach region 32 excluding the trigger sub one 35, the controller 30 changes over transmission/reception functions of the distance measuring sensors 20A, 20B to a first transmission/reception mode by the transmission/reception mode switching part 30c. In detecting a detection object which exists within the trigger sub zone 35, the controller 30 changes over the transmission/reception functions of the distance measuring sensors 20A, 20B to a second transmission/reception mode by the transmission/reception mode switching part 30c. That is, assume the case where the detection of a 20B in the first transmission/reception mode. In such a case, when the detection object exists within the trigger sub zone 35, reflection signals are inputted to the reception parts 22A, 22B in a state where radio signals are outputted from the transmission parts 21A, 21B. Accordingly, radio signals outputted from the transmission parts 21A, 21B and reflection signals interfere with each other so that the reception parts 22A, 22B cannot distinguish the radio signals and the reflection signals from each other. For this reason, a distance from the vehicle body to a detection object is erroneously recognized or cannot be measured. In view of the above, in detecting a detection object which is at a near distance from the vehicle body and exists within the trigger sub zone 35, by changing over the transmission/reception functions of the distance measuring sensors 20A, 20B to a second transmission/reception mode, it is possible to prevent a state where a distance is erroneously recognized or cannot be measured. Further, in detecting a detection object which is at a long distance and exists outside the trigger sub zone 35, by changing over the transmission/reception functions of the distance measuring sensor 20A, 20B to the first transmission/reception mode, the detection object can be surely detected with high accuracy.

Upon the detection of a state where detection objects including a user and obstacles exist within the approach region 32, the controller 30 starts the authentication of an electronic key. Then, when the electronic key is authenticated as a legitimate electronic key and a user enters the start sub zone 36, the controller 30 drives the LEDs 28 in a blinking manner via the display control part 30b thus displaying an operation mark in a blinking manner on a ground as a spotlight. Accordingly, a user moves to the trigger sub zone 35 while being guided by the spotlight. An irradiation position I where the operation mark is generated by the LEDs 28 is set within the first non-operation sub zone 37. In this manner, the operation mark allows the user to enter the trigger sub zone 35 with certainty by stepping on the operation mark with his/her foot. That is, although an operation of the user stepping on the operation mark displayed on the ground by the LEDs 28 is detected, in an actual operation, the body of the user (a part of the body of the user in the vicinity of his/her shin, for example) is detected when the user steps on the display. In this manner, the entry of the user into the trigger sub zone 35 is detected as an operation intention of the user and hence, the operation intention of the user can be detected with certainty without an erroneous detection.

When a user enters the trigger sub zone 35 passing through the start sub zone 36, the controller 30 drives the LEDs 28 in a blinking manner via the display control part 30b thus displaying an operation mark in a blinking manner on a ground as a spotlight. In this manner, the operation mark prompts the user to perform an operation for starting an open control or a close control of the door 4. That is, in performing an open control of the door 4, the controller 30 drives the LEDs 28 in a blinking manner, and stands by until the user moves back to the start sub zone 36 from the trigger sub zone 35 in accordance with the operation mark displayed in a blinking manner on the ground. Then, upon the detection of a state where the user has moved back to the start sub zone 36, the controller 30 controls the door opening and closing drive unit 12 so as to open the door 4. Also in performing a close control of the door 4, in the same manner as the open control, the controller 30 drives the LEDs 28 in a blinking manner, and stands by until the user moves back to the first portion 36a of the start sub zone 36 in accordance with the operation mark displayed in a blinking manner on the ground. In performing the close control further, also after the user has moved back to the first portion 36a, the controller 30 further stands by in a state where the operation mark is displayed in a blinking manner until the user moves back to the second portion 36b. Then, upon the detection of a state where the user has moved back to the second portion 36b, the controller 30 controls the door opening and closing drive unit 12 so as to close the door 4.

As described above, in this embodiment, by displaying the operation mark in a blinking manner on the ground by driving the LED 28 in a blinking manner, it is possible to allow a user to easily recognize an operation method and an operation timing and hence, the operability and the convenience of the user can be improved. Further, when an electronic key is authenticated and a user enters the operation zone, the LEDs 28 are driven in a blinking manner and the operation mark is displayed in a blinking manner on the ground by a spotlight. Accordingly, even when a third party who does not have the electronic key enters the operation zone, the LEDs 28 are not turned on or do not blink and hence, it is possible to prevent the wasteful power consumption of a battery.

In obstacle detection processing, exclusion cancellation processing, obstacle exclusion processing, and an approach mode which are described later, the processing is advanced to a next step by the controller 30 based on only one of detection results DA1 to DAn of the distance measuring sensor 20A and the detection results DB1 to DBn of the distance measuring sensors 20B. However, in the processing of a start mode, a trigger mode, a back mode, a close back mode 1, and a close back mode 2 which are concrete operations for the open/close control of the door 4, the processing is advanced to next step by the controller 30 on a condition that both the detection results DA1 to DAn of the distance measuring sensor 20A and the detection results DB1 to DBn of the distance measuring sensors 20B are detected. For example, in detecting a detection object which exists within the trigger sub zone 35, the distance measuring sensors 20A, 20B are operated in a second transmission/reception mode. In this case, the controller 30 determines whether or not the processing is to be advanced to next step based on both the detection results DA1 to DAn of the distance measuring sensor 20A and the detection results DB1 to DBn of the distance measuring sensors 20B.

During such processing controls, the controller 30 determines whether a detection result of a detection object is a detection result of a user who is an object to be detected or a detection result of an obstacle which is an object not to be detected based on stored information MA1 to MAn, MB1 to MBn in the memory part 30a. To be more specific, with respect to a detection object whose detection result is determined by the determination part 30e that there is no change in movement distance the set number of times continuously, the controller 30 stores distance information relating to such a detection object in the memory part 30a as obstacle information K1 to Kn. Then, the obstacle information K1 to Kn are excluded from the detection results DA1 to DAn, DB1 to DBn obtained by the distance measuring sensors 20A, 20B, and respective controls are performed based on only the detection results of other objects to be detected. Since the detection per se of the detection object which corresponds to the distance information stored in the memory part 30a as the obstacle information K1 to Kn is continued, when there is no detection results DA1 to DAn, DB1 to DBn which agree with non-detection obstacle information K1 to Kn, the subjected obstacle information K1 to Kn is deleted from the memory part 30a.

As described above, in this embodiment, based on the current detection results DA1 to DAn, DB1 to DBn and the last-time stored information MA1 to MAn, MB1 to MBn, out of the detection objects which are subjected to detection, it is possible to recognize obstacles whose detection results DA1 to DAn, DB1 to DBn do not change and a user whose detection results DA1 to DAn, DB1 to DBn change from each other. Accordingly, it is possible to prevent a state where the controller 30 is erroneously operated due to the presence of an obstacle thus erroneously performing an open/close control of the door 4 and hence, an open/close control of the door 4 can be realized with certainty by accurately determining movement of a user. The controller 30 performs an open/close control of the door 4 only when the determination part 30e detects a set movement of a detection object which is determined as an object to be detected. Accordingly, it is possible to detect an operation intention of a user stably and with high accuracy while preventing an erroneous operation which may be caused due to an animal or an obstacle other than the user.

Next, a control performed by the controller 30 is specifically described with reference to flowcharts shown in FIG. 7A to FIG. 16. An open/close control of the door 4 is started when the vehicle 1 is parked and an engine is stopped.

(General Flow)

As shown in FIG. 7A, when the engine of the vehicle 1 is stopped, the controller 30 performs the initialization thereof in step S1, and stands by until a detection time for the distance measuring sensors 20A, 20B comes in step S2. Here, the detection time differs between a case where a detection object determined as an object to be detected exists within the approach region 32 and a case where a detection object determined as an object to be detected does not exist within the approach region 32. The detection time for the case where the detection object exists within the approach region 32 is set shorter than the detection time for the case where the detection object does not exist within the approach region 32. For example, the detection is performed for every 0.5 seconds when a detection object which is an object to be detected does not exist within the approach region 32. On the other hand, the detection is performed for every 0.05 seconds when a detection object which is an object to be detected exists within the approach region 32.

When a time counted by a built-in timer of the controller 30 reaches the detection time, in step S3, radio signals are outputted from both or one of the transmission parts 21A, 21B of the distance measuring sensors 20A, 20B in accordance with the instruction from the transmission/reception mode switching part 30c. Then, in step S4, both or the other of the reception parts 22A, 22B of the distance measuring sensors 20A, 20B receive reflection signals.

Figure 7B:
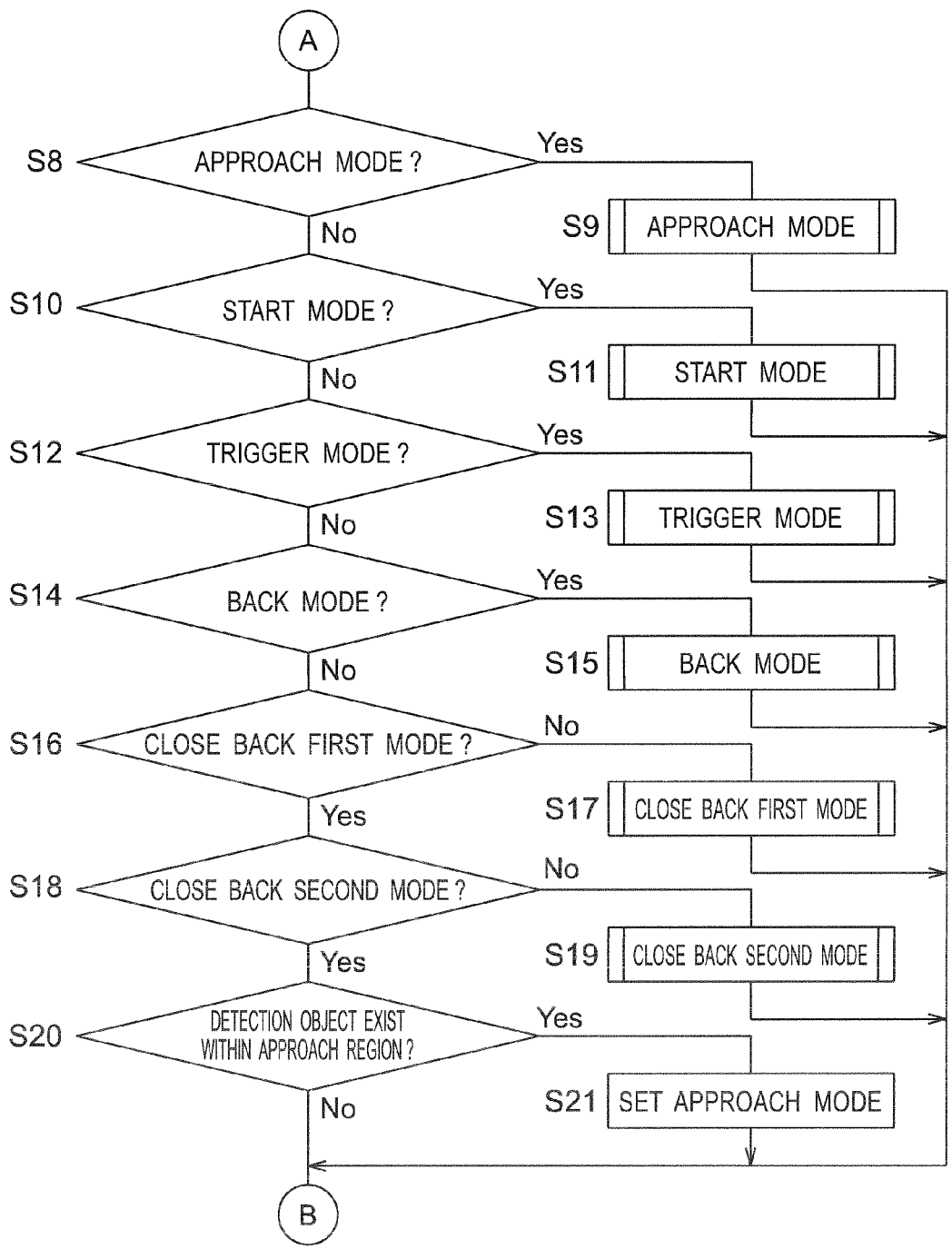
FIG. 7B is a flowchart showing steps which follow steps shown in FIG. 7A.

Next, in step S5, obstacle detection processing is performed where the presence or the non-presence of obstacles in detected detection objects is determined, and the results are stored as obstacle information K1 to Kn. Then, in step S6, exclusion cancellation processing is performed where specified obstacle information K1 to Kn are excluded from the stored obstacle information K1 to Kn and excluded information are included in (returned to) information relating to the object to be detected. Then, in step S7, obstacle exclusion processing is performed where only data relating to the object to be detected is set as an object to be determined by excluding detection results DA1 to DAn, DB1 to DBn which agree with the obstacle information K1 to Kn. Then, as shown in FIG. 7B, the controller 30 performs controls which correspond to the respective situations.

That is, in step S8, the controller 30 determines whether or not an approach mode is set. When the approach mode is set, the processing advances to step S9 and the approach mode is performed. Then, the processing returns to step S2 in FIG. 7A. The processing advances to step S10 when the approach mode is not set.

In step S10, the controller 30 determines whether or not a start mode is set. When the start mode is set, the processing advances to step S11 and the start mode is performed. Then, the processing returns to step S2 in FIG. 7A. The processing advances to step S12 when the start mode is not set.

In step S12, the controller 30 determines whether or not a trigger mode is set. When the trigger mode is set, the processing advances to step S13 and the trigger mode is performed. Then, the processing returns to step S2 in FIG. 7A. The processing advances to step S14 when the trigger mode is not set.

In step S14, the controller 30 determines whether or not a back mode is set. When the back mode is set, the processing advances to step S15 and the back mode is performed. Then, the processing returns to step S2 in FIG. 7A. The processing advances to step S16 when the back mode is not set.

In step S16, the controller 30 determines whether or not a close back first mode is set. When the close back first mode is set, the processing advances to step S17 and the close back first mode is performed. Then, the processing returns to step S2 in FIG. 7A. The processing advances to step S18 when the close back first mode is not set.

In step S18, the controller 30 determines whether or not a close back second mode is set. When the close back second mode is set, the processing advances to step S19 and the close back second mode is performed. Then, the processing returns to step S2 in FIG. 7A. The processing advances to step S20 when the close back second mode is not set.

Step S20 is performed when detection objects including a user enter the approach region 32 in a state where obstacles which exist within the approach region 32 are not yet determined or in a state where the respective modes are not set. That is, in the case where the controller 30 determines that all detection objects which can be detected by the distance measuring sensors 20A, 20B are obstacles, when a detection object other than obstacles is detected within the approach region 32 in a state where none of modes in step S8 to step S19 is set, the processing advances to step S21. Then, the approach mode is set and the processing returns to step S2 in FIG. 7A.

(Obstacle Detection Processing)

Figure 8:
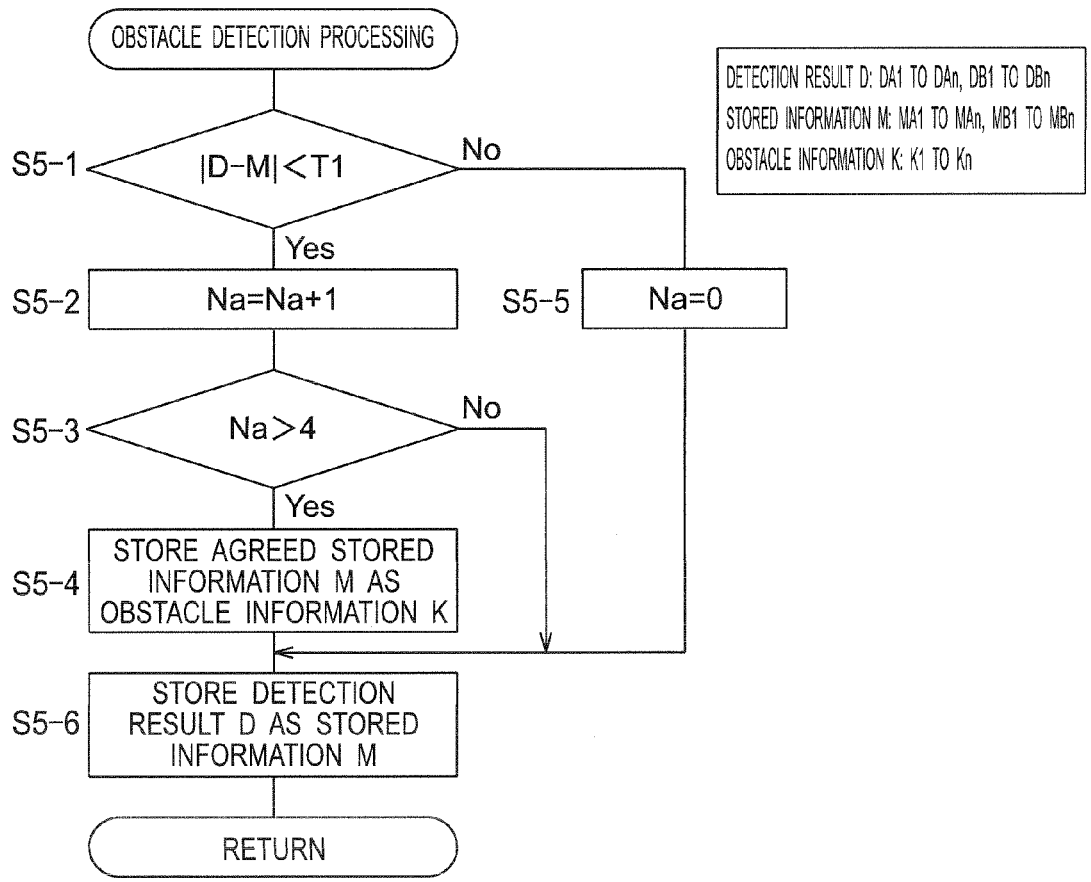
FIG. 8 is a flowchart showing an obstacle detection processing in FIG. 7A.

As shown in FIG. 8, in the obstacle detection processing performed in step S5, the controller 30 compares individual detection results D (DA1 to DAn, DB1 to DBn) with all stored information M (MA1 to MAn, MB1 to MBn), and stores specified detection results D as obstacle information K.

To be more specific, firstly, in step S5-1, the calculation is performed so as to determine whether or not an absolute value of a numerical value obtained by subtracting stored information M which is detected last time from the detection result D is smaller than a threshold value T1 (2 cm, for example). When the absolute value is smaller than the threshold value T1, that is, when the detection object is not moved, the processing advances to step S5-2 and a counter Na which is the number of times that it is determined that a detection object is an obstacle is incremented by 1.

Next, in step S5-3, the controller 30 determines whether or not the counter Na is larger than 4. The processing advances to step S5-4 when the counter Na is larger than 4, and the processing advances to step S5-6 when the counter Na is equal to or smaller than 4. In step S5-4, stored information M (detection result D) where the number of times that an absolute value of a numerical value obtained by subtracting stored information M from the detection result D becomes smaller than the threshold value T1 is more than the set number of times is stored in the memory part 30a as obstacle information K and, then, the processing advances to step S5-6.

On the other hand, when the absolute value of the numerical value obtained by subtracting the stored information M from the detection result D is equal to or larger than the threshold value T1 in step S5-1, the counter Na of the subjected detection result D is cleared (set to 0) in step S5-5, and the processing advances to step S5-6.

In this manner, when all comparisons between the current detection results D (DA1 to DAn, DB1 to DBn) and the stored information M (MA1 to MAn, MB1 to MBn) which are detected last time are finished, the detection result D is updated and stored in the memory part 30a as the stored information M in step S5-6 and, then, the processing returns to the general flow shown in FIGS. 7A and 7B.

As described above, when the determination part 30e continuously detects a state where a difference between a detection result (distance) D of a detection object and stored information (distance information) M is smaller than a set threshold value T1 the predetermined number of times, the determination part 30e determines that the subjected detection object is an object not to be detected. Accordingly, it is possible to determine whether or not a detected detection object is an object to be detected or an object not to be detected with certainty and, at the same time, it is possible to prevent a state where an object to be detected is erroneously determined as an object not to be detected.

(Exclusion Cancellation Processing)

Figure 9:
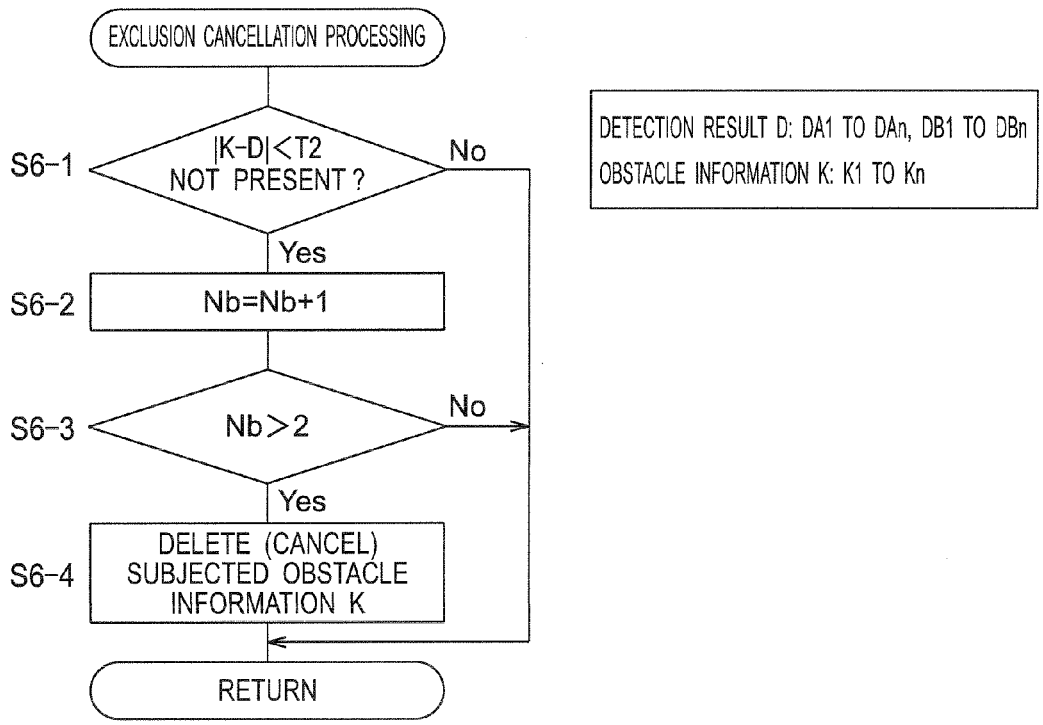
FIG. 9 is a flowchart showing an exclusion cancellation processing in FIG. 7A.

As shown in FIG. 9, in the exclusion cancellation processing performed in step S6, the controller 30 compares individual obstacle information K (K1 to Kn) with all detection results D (DA1 to DAn, DB1 to DBn). Then, the presence or the non-presence of the detection results D which agree with the obstacle information K are detected. When there is no detection result D which agrees with the obstacle information K, the subjected obstacle information K is excluded, and the detection result D is returned to detection result relating to an object to be detected.

To be more specific, firstly, in step S6-1, the calculation is performed so as to determine whether or not an absolute value of a numerical value obtained by subtracting a detection result D from obstacle information K is smaller than a threshold value T2 (2 cm, for example). When the absolute value is larger than the threshold value T2, that is, the detection result D of the detection object and the stored obstacle information K are not substantially equal to each other, the processing advances to step S6-2. On the other hand, when the detection result D and the obstacle information K are substantially equal to each other, the processing skips step S6-2 to step S6-4 and returns to the general flow.

When there is no detection result D which agrees with the obstacle information K, in step S6-2, a counter Nb which is the number of times that it is determined that there is no obstacle is incremented by 1. Then, in step S6-3, the detection is performed so as to determine whether or not the counter Nb is larger than 2. When the controller 30 determines that the counter Nb is larger than 2, the processing advances to step S6-4. On the other hand, when the controller 30 determines that the counter Nb is equal to or smaller than 2, the processing skips step S6-4 and returns to the general flow. In step S6-4, obstacle information K by which it is determined that there is no obstacle is erased from the memory part 30a so that the exclusion of the obstacle information K from the detection result D of the detection object is canceled, and the processing returns to the general flow.

As described above, when the measurement results D of detection objects do not include obstacle information K to be excluded, the subjected detection object is set as an object to be detected and hence, even in the case where a user is determined as an object not to be detected when the user temporarily stops due to some reason, the determination is cancelled when the user restarts movement. Accordingly, an erroneous recognition of the object not to be detected can be prevented.

(Obstacle Exclusion Processing)

Figure 10:
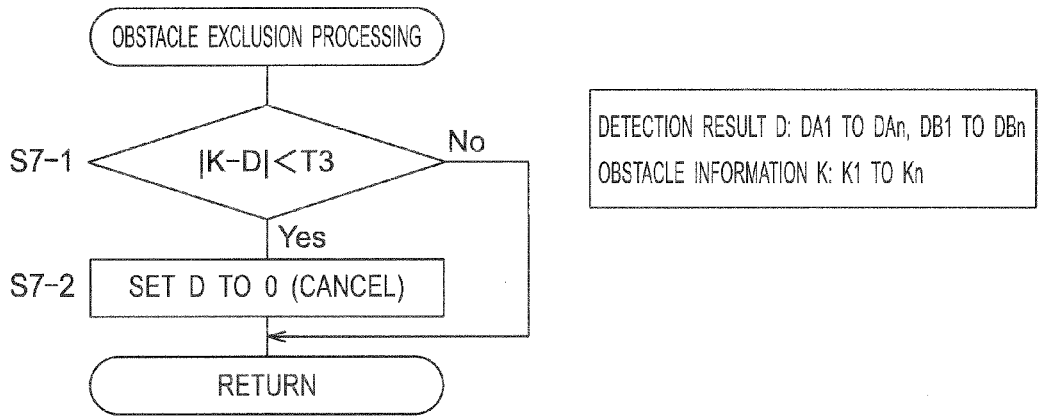
FIG. 10 is a flowchart showing an obstacle exclusion processing in FIG. 7A.

As shown in FIG. 10, in the obstacle exclusion processing performed in step S7, the controller 30 compares individual obstacle information (K1 to Kn) with all detection results D (DA1 to DAn, DB1 to DBn), and excludes the detection results D which substantially agree with the obstacle information K from the obstacle information (K1 to Kn).

To be more specific, firstly, in step S7-1, the calculation is performed so as to determine whether or not an absolute value of a numerical value obtained by subtracting the detection result D from the obstacle information K is smaller than a threshold value T3 (2 cm, for example). When the absolute value is smaller than the threshold value T3, the processing advances to step S7-2 and the subjected detection result D is excluded (=0), and the processing returns to the general flow. On the other hand, when the absolute value is equal to or larger than the threshold value T3, the processing skips step S7-2 and returns to the general flow.

As described above, the detection result D of a detection object which is continuously determined as an object not to be detected is excluded, and an object to be detected is determined based on detection results D of other detection objects. Accordingly, it is possible to increase a speed necessary for performing the determination and hence, movement of a legitimate object to be detected can be detected with high accuracy.

(Approach Mode)

Figure 11:
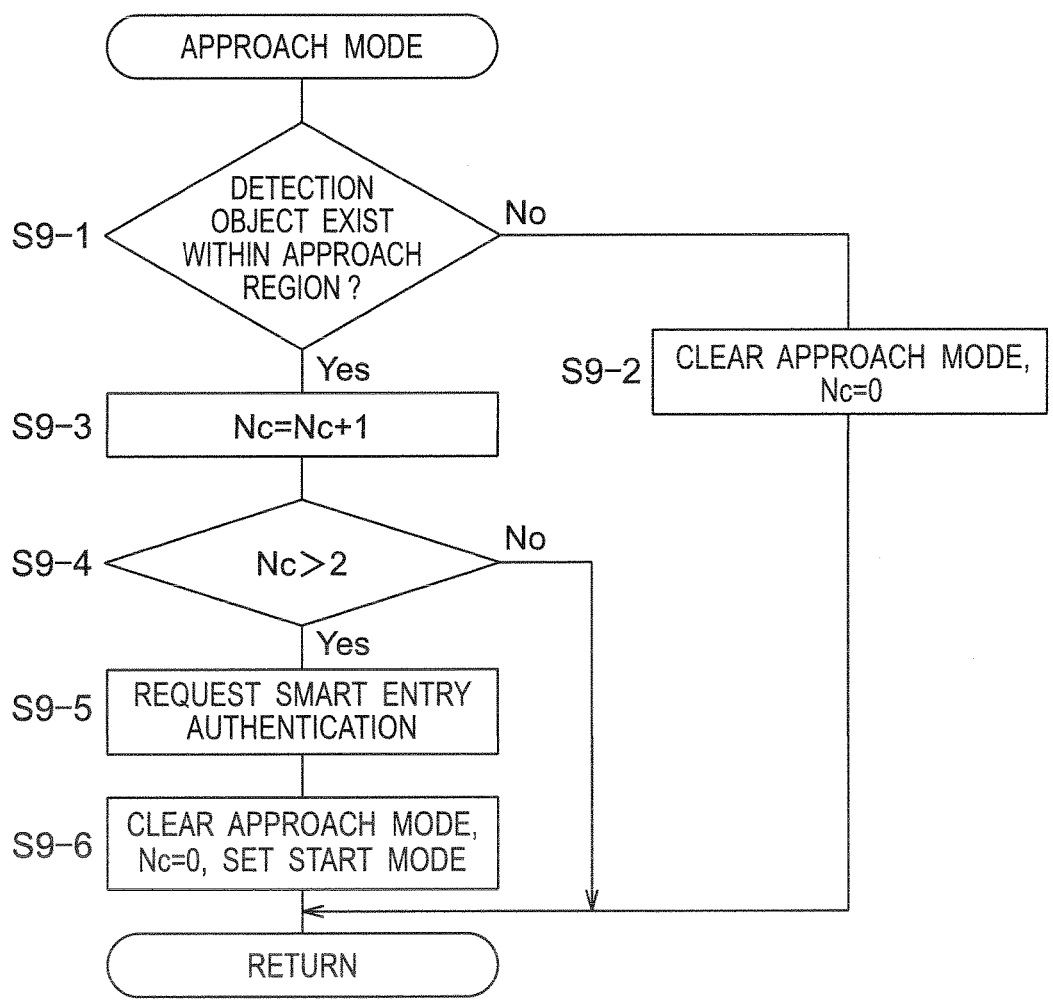
FIG. 11 is a flowchart showing an approach mode in FIG. 7B.

As shown in FIG. 11, in the approach mode performed in step S9, the controller 30 starts the authentication of an electronic key when a detection object (including a user) other than obstacles enters the approach region 32.

That is, in step S9-1, the controller 30 determines whether or not detection objects excluding obstacles enter the approach region 32. When there is no entry of detection objects into the approach region 32, the processing advances to step S9-2 and the approach mode is cleared, and a counter Nc which is the number of times that it is determined that detection objects enter the approach region 32 is cleared. Then, the processing returns to the general flow. On the other hand, when there is an entry of the detection objects into the approach region 32, the processing advances to step S9-3.

The counter Nc is incremented by 1 in step S9-3 and, then, the controller 30 determines whether or not the counter Nc is larger than 2 in step S9-4. When the counter Nc is larger than 2, the processing advances to step S9-5. On the other hand, when the counter Nc is equal to or smaller than 2, the processing skips step S9-5 and step S9-6 and returns to the general flow.

In step S9-5, the controller 30 outputs a smart entry authentication request signal to the host ECU 5. Upon the reception of such a signal, the host ECU 5 requests the electronic key to transmit an authentication code to the host ECU 5, and compares he authentication code which the host ECU 5 receives with an authorized code registered in the host ECU 5. Next, in step S9-6, the approach mode is cleared, the counter Nc is cleared and a start mode is set and, then, the processing returns to the general flow.

As described above, before an operation intention of a user is detected in the operation zone 34, the approach of the user is detected by detecting the detection object in the approach region 32, and the authentication of the key is performed. Accordingly, the detection of an operation intention of a user can be rapidly performed and hence, the convenience of a user can be enhanced.

(Start Mode)

Figure 12:
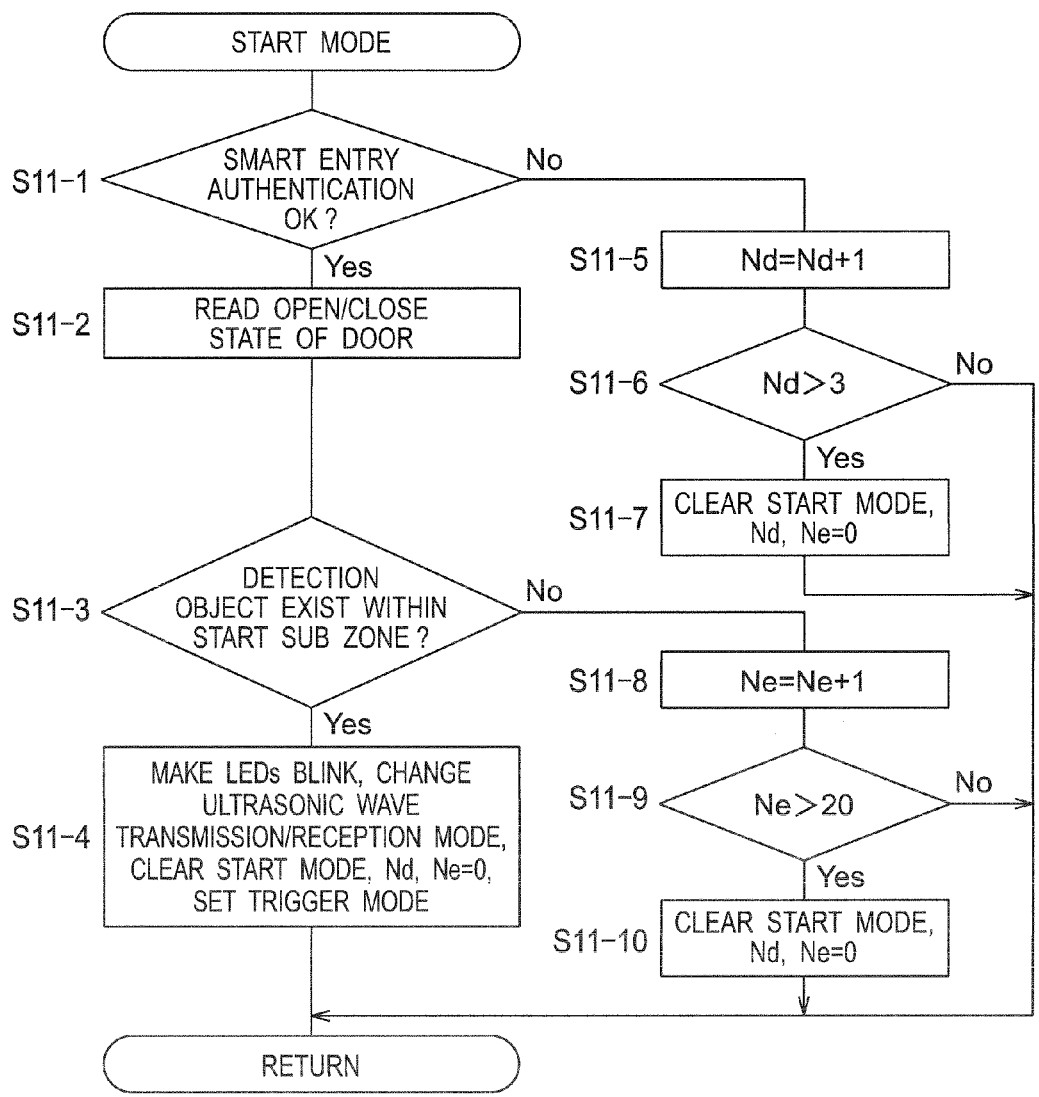
FIG. 12 is a flowchart showing a start mode in FIG. 7B.

As shown in FIG. 12, in the start mode performed in step S11, when an electronic key is authenticated as a legitimate electronic key and a user is positioned in the start sub zone 36, the controller 30 prompts a user to perform an operation for opening or closing a door.

That is, in step S11-1, the controller 30 confirms whether or not the smart entry authentication is normally performed based on the reception of a signal outputted from the host ECU 5. When the electronic key is normally authenticated, the processing advances to step S11-2. On the other hand, when the electronic key is not normally authenticated, the processing advances to step S11-5.

In step S11-2, the controller 30 reads whether the door 4 is in an open state or in a closed state based on a signal outputted from the door opening and closing drive unit 12. Next, in step S11-3, the controller 30 determines whether or not a detection object is positioned. within the start sub zone 36 (P1 in FIG. 5, for example). When the detection object exists within the start sub zone 36, the processing advances to step S11-4. On the other hand, when the detection object does not exist within the start sub zone 36, the processing advances to step S11-8.

In step S11-4, the LEDs 28 are blinked through the display control part 30b, a transmission/reception mode of the distance measuring sensor 20A, 20B is changed over to a second transmission/reception mode through the transmission/reception mode switching part 30c, and the start mode is cleared. Further, a counter Nd which is the number of times that the smart entry authentication is rejected is cleared. A counter Ne which is the number of times that a detection object cannot be detected within the start sub zone 36 is cleared. The trigger mode is set. Then, the processing returns to the general flow.

When the smart entry authentication is rejected in step S11-1, the counter Nd is incremented by 1 in step S11-5 and, then, the controller 30 determines whether or not the counter Nd is larger than 3 in step S11-6. When the counter Nd is larger than 3, the processing advances to step S11-7 where the start mode is cleared and the counters Nd, Ne are cleared. Then, the processing returns to the general flow. On the other hand, when the counter Nd is equal to or smaller than 3, the processing skips step S11-7 and returns to the general flow.

When a detection object cannot be detected within the start sub zone 36 in step S11-3, the counter Ne is incremented by 1 in step S11-8 and, then, the controller 30 determines whether or not the counter Ne is larger than 20 in step S11-9. When the counter Ne is larger than 20, the processing advances to step S11-10 where the start mode is cleared and the counters Nd, Ne are cleared. Then, the processing returns to the general flow. On the other hand, when the counter Ne is smaller than 20, the processing skips step S11-10 and returns to the general flow.

(Trigger Mode)

Figure 13:
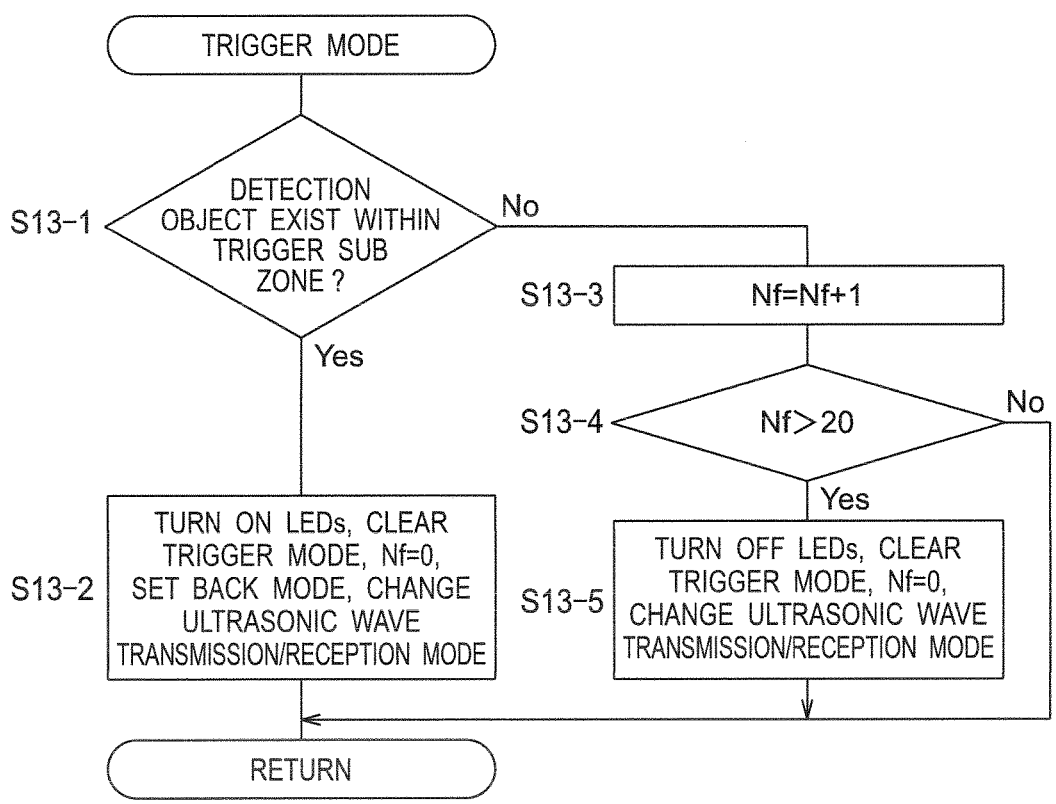
FIG. 13 is a flowchart showing a trigger mode in FIG. 7B.

As shown in FIG. 13, in the trigger mode performed in step S13, the controller 30 prompts a user to perform an operation for starting an open control or a close control of the door 4 when the user is positioned within the trigger sub zone 35.

That is, in step S13-1, the controller 30 determines whether or not there is an entry of a detection object into the trigger sub zone 35 (P2 in FIG. 5, for example). When there is an entry of the detection object into the trigger sub zone 35, the processing advances to step S13-2 where the LEDs 28 are turned on, and the trigger mode is cleared. Further, a counter Nf which is the number of times that a detection object cannot be detected within the trigger sub zone 35 is cleared. The back mode is set. A transmission/reception mode of the distance measuring sensor 20A, 20B is changed over to a first transmission/reception mode. Then, the processing returns to the general flow.

On the other hand, when the entry of the detection object into the trigger sub zone 35 cannot be detected in step S13-1, the counter Nf is incremented by 1 in step S13-3 and, then, the controller 30 determines whether or not the counter Nf is larger than 20 in step S13-4. When the counter Nf is larger than 20, the processing advances to step S13-5 where the LEDs 28 are turned off, and the trigger mode is cleared and, at the same time, the counter Nf is cleared. Further, a transmission/reception mode of the distance measuring sensors 20A, 20B is changed over to a first transmission/reception mode. Then, the processing returns to the general flow. On the other hand, when the counter Nf is smaller than 20, the processing skips step S13-5 and returns to the general flow.

(Back Mode)

Figure 14:
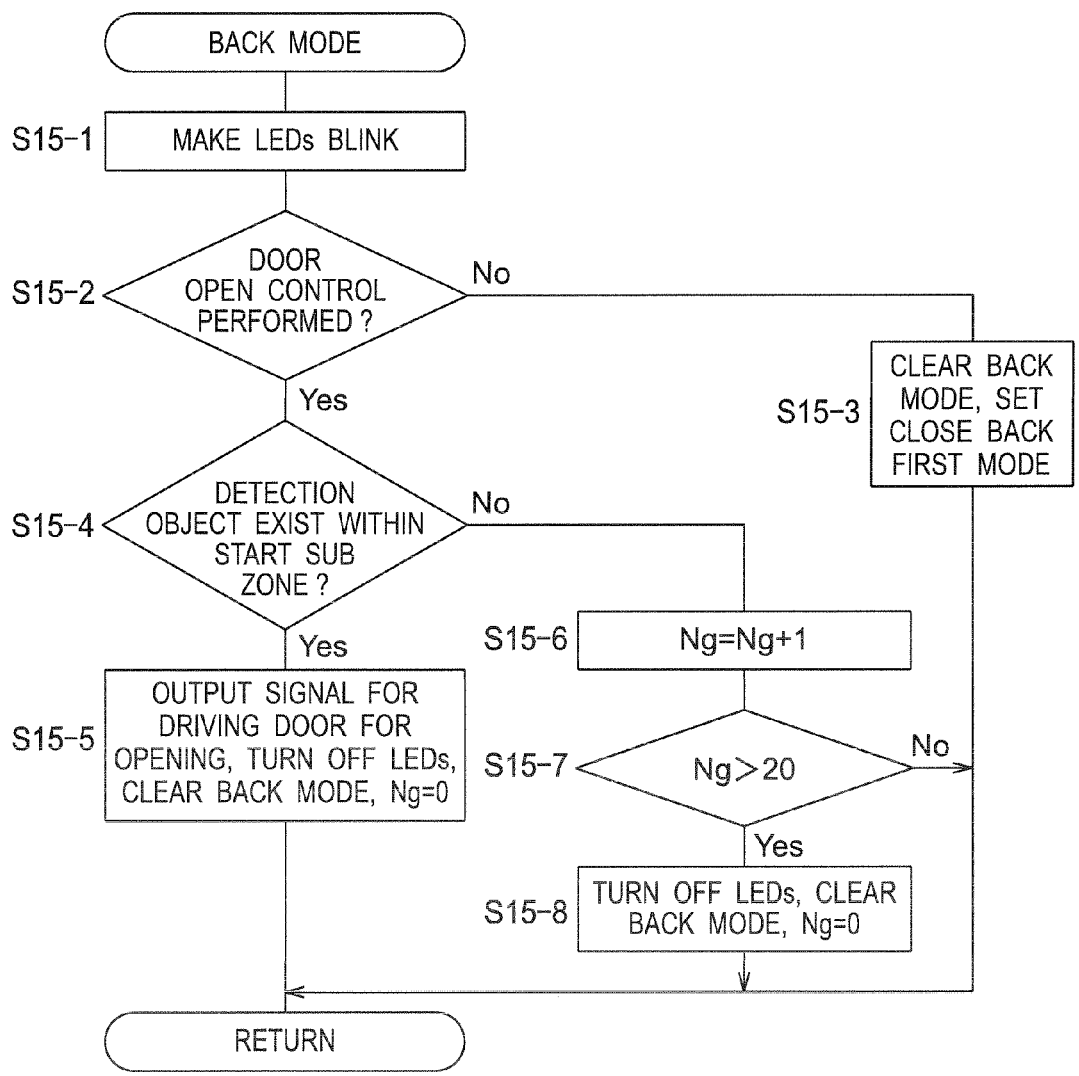
FIG. 14 is a flowchart showing a back mode in FIG. 7B.

As shown in FIG. 14, in the back mode performed in step S15, the controller 30 prompts a user to move away from the vehicle 1 and to perform an operation for starting opening or closing of the door 4. When a control for opening the door 4 is performed, an open control of the door 4 is performed.

That is, the LEDs 28 are blinked in step S15-1. Then, in step S15-2, the controller 30 determines whether an open control of the door 4 or a close control of the door 4 is to be performed based on a current open/close state of the door 4. When the close control of the door 4 is selected, the processing advances to step S15-3 where the back mode is cleared and a close back first mode is set. Then, the processing returns to the general flow. On the other hand, when the open control of the door 4 is selected the processing advances to step S15-4.

In step S15-4, the controller 30 determines whether or not a detection object is moved back to the start sub zone 36 (P3 in FIG. 5, for example). When the detection object is moved back to the start sub zone 36, the processing advances to step S15-5. On the other hand, when the detection object is not moved back to the start sub zone 36, the processing advances to step S15-6.

In step S15-5, the controller 30 drives the door opening and closing drive unit 12 for opening the door 4 by outputting a signal for opening the door 4 to the door opening and closing drive unit 12, and the LEDs 28 are turned off. Further, the back mode is cleared. A counter Ng which is the number of times that the detection object cannot be detected within the start sub zone 36 is cleared. Then, the processing returns to the general flow. With such operations, the door 4 of the vehicle 1 is opened with respect to the vehicle body 2.

In step S15-6, the counter Ng is incremented by 1 and, then, the controller 30 determines whether or not the counter Ng is larger than 20 in step S15-7. When the counter Ng is larger than 20, the processing advances to step S15-8 where the LEDs 28 are turned off, the back mode is cleared, and the counter Ng is cleared. Then, the processing returns to the general flow. On the other hand, when the counter Ng is smaller than 20, the processing skips step S15-8 and returns to the general flow.

(Close Back First Mode)

Figure 15:
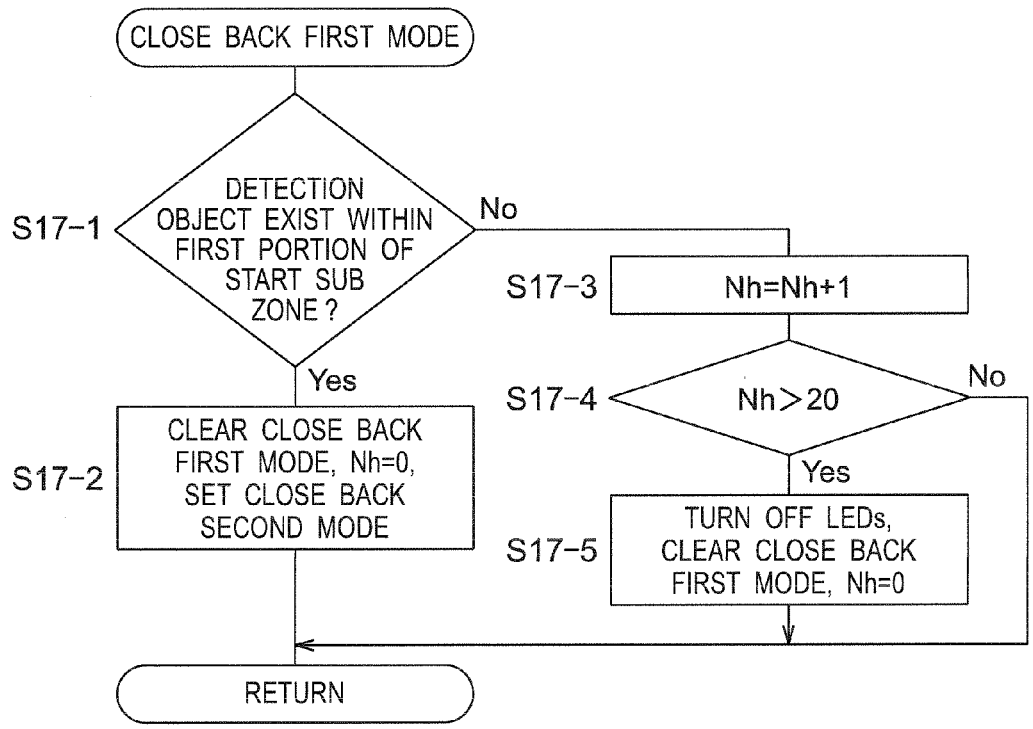
FIG. 15 is a flowchart showing a close back first mode in FIG. 7B.

As shown in FIG. 15, in the close back first mode, the controller 30 confirms whether or not a user moves away from the vehicle 1.

That is, in step S17-1, the controller 30 determines whether or not a detection object is moved back to the first portion 36a of the start sub zone 36 (P3 in FIG. 5, for example). When the detection object is moved back to the first portion 36a, the processing advances to step S17-2 and the close back first mode is cleared. Further, a counter Nh which is the number of times that a detection object cannot be detected within the first portion 36a is cleared. The close back second mode is set. Then, the processing returns to the general flow.

On the other hand, when the detection object is not moved back to the first portion 36a in step S17-1, the counter Nh is incremented by 1 in step S17-3 and, then, the controller 30 determines whether or not the counter Nh is larger than 20 in step S17-4. When the counter Nh is larger than 20, the processing advances to step S17-5 where the LEDs 28 are turned off, the close back first mode is cleared and the counter Nh is cleared. Then, the processing returns to the general flow. On the other hand, when the counter Nh is smaller than 20, the processing skips step S17-5 and returns to the general flow.

(Close Back Second Mode)

Figure 16:
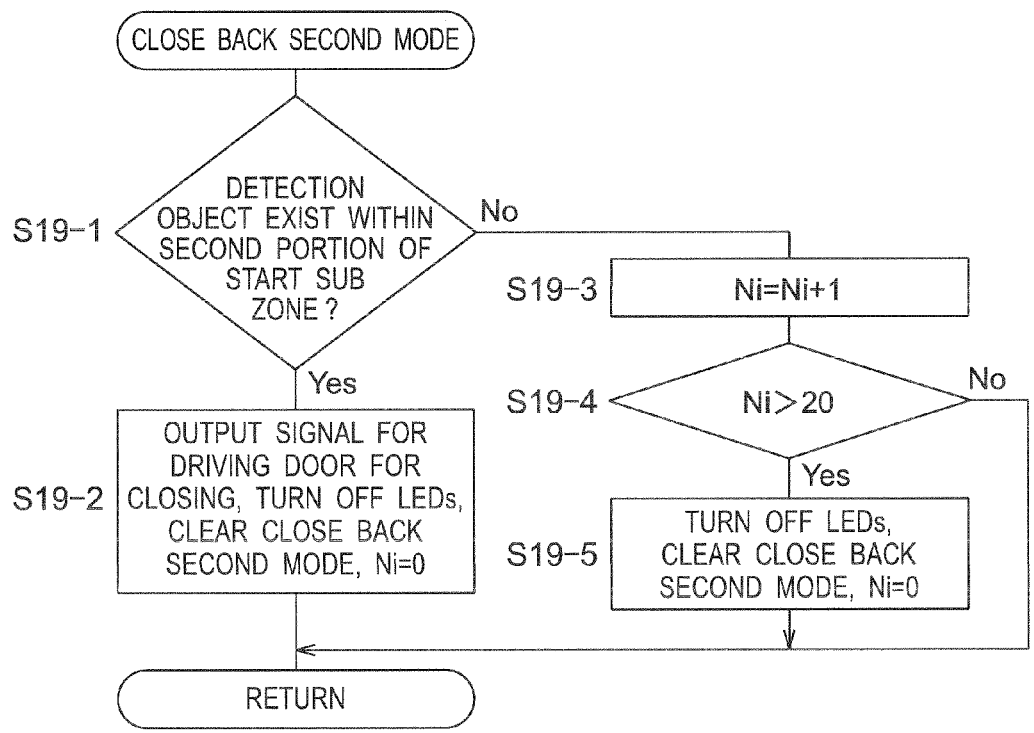
FIG. 16 is a flowchart showing a close back second mode in FIG. 7B.

As shown in FIG. 16, in the close back second mode, the controller 30 confirms whether or not a user moves away from the vehicle 1 to a safe position and, then, the controller 30 performs an operation for closing the door 4.

That is, in step S19-1, the controller 30 determines whether or not a detection object is moved back to the second portion 36b of the start sub zone 36 (P4 in FIG. 5, for example). When the detection object is moved back to the second portion 36b, the processing advances to step S19-2 where the controller 30 drives the door opening and closing drive unit 12 for closing the door 4 by outputting a signal for closing the door 4 to the door opening and closing drive unit 12, and the LEDs 28 are turned off. Further, the close back second mode is cleared, and a counter Ni which is the number of times that a detection object cannot be detected within the second portion 36b is cleared. Then, the processing returns to the general flow. With such operations, the door 4 of the vehicle 1 is closed with respect to the vehicle body 2.

On the other hand, when the detection object is not moved back to the second portion 36b in step S19-1, the counter Ni is incremented by 1 in step S19-3 and, then, the controller 30 determines whether or not the counter Ni is larger than 20 in step S19-4. When the counter Ni is larger than 20, the processing advances to step S19-5 where the LEDs 28 are turned off, the close back second mode is cleared and the counter Ni is cleared. Then, the processing returns to the general flow. On the other hand, when the counter Ni is smaller than 20, the processing skips step S19-5 and returns to the general flow.

According to the door opening and closing device 10 having such a configuration, as shown in FIG. 5, movement of a user which is a specified object to be detected can be detected with certainty among a plurality of detection objects including obstacles O1, O2. Further, an open control or a close control of the door 4 is performed upon the detection of a set specified movement of a user and hence, an erroneous operation can be prevented with certainty and, at the same time, the convenience of a user can be largely enhanced.

The door opening and closing device 10 of the present invention is characterized by the configuration where the controller 30 performs an open/close control of the door 4 based on the detection results D of the distance measuring sensors 20A, 20B and stored information M in the memory part 30a. Other configurations of the door opening and closing device 10 of the present invention are not limited to configurations in the embodiment, and various modifications are conceivable.

For example, the first and second (two) distance measuring sensors 20A, 20B are disposed as the detection units. However, three or more distance measuring sensors may be disposed, or one distance measuring sensor may be disposed. Further, the operation zone 34 is divided into two operation detection sub zones 35, 36. However, the operation zone 34 may be divided into three or more operation detection sub zones.

In the embodiment, the determination part 30e compares a difference between the detection result D and the stored information M with the threshold value T1 and, when the determination part 30e determines that the detection result D and the stored information M are substantially equal to each other continuously the set number of times, the detection object is determined as an object not to be detected. However, the determination part 30e may determine the detection object as an object not to be detected when the determination part 30e detects that the detection result D and the stored information M are substantially equal to each other continuously for a set time. In the same manner, the determination part 30e may compare a difference between the detection result D and the obstacle information K with the threshold value T2 and, when the determination part 30e determines that the detection result D and the obstacle information K are not substantially equal to each other continuously for a set time, such obstacle information may be excluded from the obstacle information K. Further, the threshold values T1 to T3 based on which it is determined whether or not a detection result and obstacle information are substantially equal to each other may take different numerical values. Further, a condition under which a detection object is determined as an object not to be detected by excluding a specified detection object from obstacle information K is not limited to the set number of times or the continuous detection for a set time, and may be combined with other detection condition.

What is claimed is:

1. A door opening and closing device comprising:
   a door opening and closing drive unit capable of opening and closing a door with respect to a vehicle body;
   a detection unit configured to detect, at a same time, a plurality of detection objects within a detection range, the detection range being set around the door;
   a memory part configured to store a plurality of detection results corresponding to the plurality of detection objects, respectively, which are detected by the detection unit;
   a control unit configured to perform a control of the door by the door opening and closing drive unit based on the plurality of detection results and a plurality of stored information stored in the memory part; and
   a determination part configured to determine whether a first detection object among the plurality of detection objects existing within the detection range is an object with a set movement or an object that is an obstacle, based on a detection result,
   wherein the control unit performs the control of the door by way of the door opening and closing drive unit when the determination part determines that the first detection object has the set movement.

2. The door opening and closing device according to claim 1, further comprising a measurement part configured to measure a first distance from the detection unit to the first detection object, wherein
   the first distance information of the first detection object measured by the measurement part is stored in the memory part, and
   the determination part determines whether the first detection object is the object with the set movement or the object that is the obstacle based on a change amount in the first distance from the detection unit to the first detection object.

3. The door opening and closing device according to claim 2, wherein the first distance information of the first detection object is stored in the memory part, and
   wherein second distance information of a second detection object among the plurality of detection objects existing within the detection range is additionally stored in the memory part.

4. The door opening and closing device according to claim 2, wherein the determination part determines that the first detection object is the object that is the obstacle when a state where a difference between a second distance from the detection unit to the first detection object which is measured by the measurement part and the first distance information of the first detection object measured by the measurement part that is stored in the memory part is continuously detected as smaller than a set threshold value.

5. The door opening and closing device according to claim 4, wherein the determination part excludes a detection result of the first detection object which the determination part continuously determines as the object that is the obstacle, and determines an object with set movement based on another detection result of another detection object among the plurality of detection objects.

6. The door opening and closing device according to claim 5, wherein the determination part, when distances of detection objects among the plurality of detection objects which are measured by the measurement part do not correspond with distance information of the object that is the obstacle, sets the detection objects as objects with set movement.

* * * * *